(12) United States Patent
Nishio et al.

(10) Patent No.: US 12,030,321 B2
(45) Date of Patent: Jul. 9, 2024

(54) PRINTING DEVICE AND PRINTING METHOD

(71) Applicant: MIMAKI ENGINEERING CO., LTD., Nagano (JP)

(72) Inventors: Keita Nishio, Nagano (JP); Izumi Mizukami, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 231 days.

(21) Appl. No.: 17/761,203

(22) PCT Filed: Jul. 27, 2020

(86) PCT No.: PCT/JP2020/028696
§ 371 (c)(1),
(2) Date: Mar. 17, 2022

(87) PCT Pub. No.: WO2021/053970
PCT Pub. Date: Mar. 25, 2021

(65) Prior Publication Data
US 2022/0348026 A1    Nov. 3, 2022

(30) Foreign Application Priority Data

Sep. 19, 2019 (JP) ................................. 2019-170354
Sep. 19, 2019 (JP) ................................. 2019-170359

(51) Int. Cl.
*B41J 2/21*    (2006.01)
*B41J 2/045*    (2006.01)
(52) U.S. Cl.
CPC ......... *B41J 2/2103* (2013.01); *B41J 2/04586* (2013.01); *B41J 2/2117* (2013.01)

(58) Field of Classification Search
CPC ...................................................... B41J 2/2117
See application file for complete search history.

(56) References Cited

U.S. PATENT DOCUMENTS

2013/0330476 A1   12/2013   Klein Koerkamp et al.
2015/0230562 A1   8/2015   Jones et al.
(Continued)

FOREIGN PATENT DOCUMENTS

JP    2015168186    9/2015
JP    2016043618    4/2016
(Continued)

OTHER PUBLICATIONS

Watabe, Machine Translation of JP-6036309-B2, 2016 (Year: 2016).*
(Continued)

*Primary Examiner* — Scott A Richmond
(74) *Attorney, Agent, or Firm* — JCIPRNET

(57) ABSTRACT

A raised shape is appropriately formed on a medium. A printing device 10 includes inkjet heads 102y to 102k that are a plurality of color ink heads, an inkjet head 102w that is a light reflective ink head, and a controller 30. The controller 30 causes the inkjet heads 102y to 102k and the inkjet head 102w to form a layered ink region and an image region on the medium 50. The layered ink region is a region including a plurality of colored regions (four-color regions) that are colored regions formed by causing at least two inkjet heads among the plurality of inkjet heads 102y to 102k to eject ink, and a plurality of white layers that are light reflecting regions formed on the colored region. The colored regions in the layered ink region are superimposed with at least the white layer interposed therebetween.

17 Claims, 12 Drawing Sheets

(56) References Cited

U.S. PATENT DOCUMENTS

2016/0136982 A1* 5/2016 Heath ................ G03G 15/224
347/5
2016/0318258 A1 11/2016 Valade

FOREIGN PATENT DOCUMENTS

| JP | 6036309 B2 * | 11/2016 | ............... B41J 2/07 |
| JP | 2017065240 | 4/2017 | |
| JP | 2019508286 | 3/2019 | |

OTHER PUBLICATIONS

"International Search Report (Form PCT/ISA/210) of PCT/JP2020/028696," mailed on Oct. 20, 2020, with English translation thereof, pp. 1-5.

"Office Action of Japan Counterpart Application", issued on Feb. 21, 2023, with English translation thereof, p. 1-p. 10.

"Office Action of Japan Counterpart Application", issued on Jun. 6, 2023, with English translation thereof, p. 1-p. 10.

* cited by examiner (a)

(b)

(a)

(b)

PRINTING DEVICE AND PRINTING METHOD

CROSS-REFERENCE TO RELATED APPLICATION

This application is a 371 application of the International PCT application serial no. PCT/JP2020/028696, filed on Jul. 27, 2020, which claims the priority benefits of Japan Patent Application No. 2019-170354, filed on Sep. 19, 2019, and Japan Patent Application No. 2019-170359, filed on Sep. 19, 2019. The entirety of each of the above-mentioned patent applications is hereby incorporated by reference herein and made a part of this specification.

TECHNICAL FIELD

The present invention relates to a printing device and a printing method.

BACKGROUND ART

Conventionally, an inkjet printer, which is a printing device that prints according to an inkjet method, has been widely used. Additionally, in recent years, as a printing method performed by an inkjet printer, it has been considered to form an irregularly raised shape on a medium (see Patent Literature 1, for example).

CITATION LIST

Patent Literature

Patent Literature 1: Japanese Unexamined Patent Publication No. 2016-43618

SUMMARY OF INVENTION

Technical Problems

An inkjet printer ejects ink onto a medium by using an inkjet head that ejects a small amount of ink (ink droplets) according to an inkjet head method. Then, in this case, in order to form a raised shape on a medium with the inkjet head, it is usually necessary to form a large number of ink layers on top of one another. For this reason, conventionally, there has been a problem that a longer time is required for the printing operation to form the plurality of ink layers. Hence, the present invention provides a printing device and a printing method capable of solving the above problems.

Solutions to Problems

The inventor of the present application has been diligently researching a method for shortening the time required for printing in the case of forming a raised shape (layered ink region) on a medium by superimposing a plurality of ink layers. Then, it was considered that the layered ink region could be formed in a shorter time by forming the layered ink region using a plurality of inkjet heads.

More specifically, in the conventional method, when the layered ink region is formed on a medium by an inkjet head, the layered ink region is usually formed by superimposing layers of a predetermined one color ink such as clear color or white. With this configuration, the layered ink region on the medium can be appropriately formed with, for example, an ink that does not easily affect an image drawn with color ink on the layered ink region.

On the other hand, the inventor of the present application has considered forming a layered ink region in a shorter time by using a plurality of colors of ink instead of using only one color of ink. Additionally, in this case, for a plurality of inkjet heads that eject inks of a plurality of colors used for forming the layered ink region, for example, if a dedicated inkjet head for forming the layered ink region is used, the cost will increase significantly to shorten the time of forming of the layered ink region. Against this background, the inventor of the present application has further studied and conceived of using, to form the layered ink region as well, a plurality of inkjet heads for color printing which are used when drawing an image. With such a configuration, for example, the layered ink region can be appropriately formed in a shorter time without excessively increasing the number of inkjet heads used. Additionally, this makes it possible to appropriately prevent extension of time required for the printing operation, for example.

However, in this case, if an image is drawn directly with color ink on the colored region formed by inks of a plurality of colors, it becomes difficult to view the image properly due to the influence of the color of the colored region. Hence, the inventor of the present application has conceived of forming a layer of light reflective ink such as white on the colored region and concealing the color of the colored region. With such a configuration, by drawing an image with color ink on the layer of light reflective ink, the image can be viewed more appropriately.

However, as a result of actual confirmation by the inventor of the present application in various experiments and the like, even in such a configuration, a deviation occurs between the outer edge position of the colored region and the outer edge position of the light reflective ink layer. Hence, the colored area cannot be sufficiently concealed by the reflective ink layer in some cases. In this case, the color of the colored region becomes conspicuous when the image is viewed, which may deteriorate the print quality.

On the other hand, the inventor of the present application has conducted further diligent research and has found that the influence of the colored region in the layered ink region can be curbed more appropriately by forming the layer of light reflective ink not only at the uppermost part of the layered ink region, but also as some of a plurality of ink layers forming the layered ink region other than those at the uppermost part.

Additionally, the inventor of the present application has found the characteristics necessary for obtaining such an effect through further diligent research, and has obtained the present invention. In order to solve the above problems, the present invention is a printing device that prints on a medium according to an inkjet method. The printing device includes a plurality of color ink heads that are a plurality of inkjet heads that eject different color inks; a light reflective ink head that is an inkjet head that ejects light reflective ink; and a controller that controls operation of the plurality of color inkjet heads and the light reflective ink head. The controller causes the plurality of color ink heads and the light reflective ink head to form, on the medium, a layered ink region that is a region where a plurality of ink layers overlap the medium, and an image region that is a region where an image is drawn by the plurality of color ink heads on the layered ink region. The layered ink region is a region including a plurality of colored regions that are colored regions formed by causing at least two inkjet heads among the plurality of color ink heads to eject ink, and a plurality of light reflecting regions that are regions formed on the colored region using light reflective ink. Further, the controller causes the plurality of color ink heads and the light reflective ink head to form a plurality of the colored regions and a plurality of the light reflecting regions so that the colored regions are superimposed with at least the light reflecting region interposed therebetween.

With such a configuration, it is possible to appropriately shorten the time required to form the layered ink region by using the plurality of inkjet heads when forming the colored region forming a part of the layered ink region. Additionally, in this case, by forming the region to be colored with a plurality of color ink heads, it is possible to prevent an increase in the number of inkjet heads included in the printing device. Further, in this case, by forming a plurality of colored regions so as to interpose the light reflecting region therebetween, the colored region can be more appropriately covered by the light reflecting region. Additionally, for example, it is possible to appropriately prevent the influence of the color in the colored region when an image is viewed in the image region. For this reason, with such a configuration, for example, when a raised shape is formed on the medium by forming a plurality of ink layers on top of one another, it is possible to appropriately prevent an increase in the time required for the printing operation.

Here, in this configuration, each of the plurality of color ink heads ejects a certain ink among a plurality of colors used as a basic color for color printing, for example. Additionally, in this configuration, the printing device further includes a main scan driving unit that causes the plurality of color ink heads and the light reflective ink head to perform, for example, a main scan of ejecting ink while moving relative to the medium in a preset main scanning direction. Then, in this case, in the main scan performed to form the colored region, the controller causes at least two inkjet heads among the plurality of color ink heads to eject ink to make the total amount of ink ejected in one main scan larger than a case where the main scan is performed using only one inkjet head. With this configuration, for example, the time required to form the layered ink region can be appropriately shortened.

Additionally, in this configuration, the printing device includes, as the plurality of color ink heads, for example, an inkjet head that ejects yellow ink, an inkjet head that ejects magenta ink, an inkjet head that ejects cyan ink, and an inkjet head that ejects black ink. With this configuration, for example, an image region expressing a color image can be appropriately formed. Additionally, in this case, at the time of forming the colored region, the controller causes at least the four inkjet heads that eject yellow, magenta, cyan, and black ink to eject ink. With this configuration, for example, the time required to form the layered ink region can be shortened more appropriately.

Additionally, in this configuration, it is conceivable to form a region other than the light reflecting region and the colored region as the region forming the layered ink region. More specifically, in this case, the colored region in the layered ink region can be considered to be a region or the like that is uniformly colored with a mixture of inks of a plurality of colors, unlike the image or the like drawn on the image region, for example. Then, in this case, in addition to the colored region, it is conceivable to further form a colored region that is a region to be colored with a color matching the image drawn in the image region. In this case, for example, the controller causes the plurality of color ink heads to form a region to be colored that is a region to be colored with a color matching the image drawn on the image region, on at least some of the light reflecting regions in the layered ink region. With such a configuration, for example, it is possible to more appropriately prevent the influence of the color in the colored region when viewing the image in the image region.

Additionally, in this case, for example, it is conceivable to form a region to be colored on all the light reflecting regions other than the uppermost light reflecting region. With such a configuration, by forming the light reflecting region and the region to be colored on each colored region, it is possible to more appropriately prevent the influence of the color of the colored region. Additionally, in this case, it is conceivable to form an image region on the uppermost light reflecting region.

Additionally, when a plurality of color ink heads and a light reflective ink head are subjected to a main scan, at least two inkjet heads used for forming the colored region are, for example, are arranged side by side in the main scanning direction with their positions aligned in the sub scanning direction orthogonal to the main scanning direction. With this configuration, for example, a plurality of inkjet heads can be used to appropriately form a colored region. More specifically, when the colored region is formed by using the four inkjet heads ejecting yellow, magenta, cyan, and black ink, it is preferable that these four inkjet heads be arranged side by side in the main scanning direction with their positions aligned in the sub scanning direction.

Additionally, in this configuration, the printing device further includes a sub scan driving unit that causes the plurality of color ink heads and the light reflective ink head to perform, for example, a sub scan of moving relative to the medium in a sub scanning direction. In this case, the light reflective ink head is arranged so as to be shifted from at least two inkjet heads used for forming the colored region in the sub scanning direction. Shifting the position in the sub scanning direction means, for example, to arrange so that positions in the sub scanning direction do not overlap. The light reflective ink head is arranged, for example, at a position adjacent to at least two inkjet heads used for forming a colored region in the sub scanning direction. Additionally, in this case, the controller controls the main scan driving unit and the sub scan driving unit so that main scan is repeatedly performed with sub scan is interposed therebetween, for example. As a result, for example, the controller causes the plurality of color ink heads and the light reflective ink head to form a plurality of colored regions and a plurality of light reflecting regions so that the colored regions are superimposed with at least the light reflecting region interposed therebetween. With such a configuration, for example, a layered ink region having a colored region and a light reflecting region can be appropriately formed.

Additionally, when a plurality of ink layers are formed on top of one another using an inkjet head, for example, the outer edges of the ink layers tend to have a raised shape as compared with other parts. In particular, when a large amount of ink is ejected using a plurality of inkjet heads as in the case of forming the colored region in the layered ink region, such a raised shape tends to be formed. In this case, if the swelling is remarkable, it may cause deviation between the outer edge of the colored region and the outer edge of the light reflecting region. On the other hand, in order to reduce the influence of the swelling of the outer edge, for example, regarding the way of superimposing the plurality of ink layers in the layered ink region, it is conceivable to make the forming range of the upper ink layers smaller than the forming range of the lower ink layers. In this case, at the time of forming the layered ink region, the controller sets a forming range of at least some of a plurality of ink layers forming the layered ink region to be smaller than a forming range of lower ink layers. With such a configuration, the influence of the raised shape of the outer edge of the ink layer can be appropriately reduced. Additionally, in this case, since the outer edge positions of the ink layers are shifted and the raised parts do not overlap, for example, the texture of the side surface part can be improved, for example.

Additionally, in this case, it is preferable that the layered ink region be formed so as to have a stepped edge, for example. The stepped edge means that, for example, the outer edge positions of ink layers forming the layered ink region are gradually varied to be located inward from the lower layer toward the upper layer. In this case, for example, it is conceivable to vary the outer edge position every time a predetermined number of ink layers are formed.

Additionally, the inventor of the present application has been diligently researching a method for shortening the time required for printing in the case of forming a raised shape (raised shape) as the colored region on a medium by superimposing a plurality of ink layers. Then, it was considered that the raised region formed by superimposing a plurality of ink layers could be formed in a shorter time by forming the raised region using a plurality of inkjet heads.

More specifically, in the conventional method, when the raised region is formed on a medium by an inkjet head, the raised region is usually formed by superimposing layers of a predetermined one color ink such as clear color or white. With this configuration, the raised region on the medium can be appropriately formed with, for example, an ink that does not easily affect an image drawn with color ink on the layered ink region.

On the other hand, the inventor of the present application has considered forming a raised region in a shorter time by using a plurality of colors of ink instead of using only one color of ink. Additionally, in this case, instead of drawing the image directly on the raised region, it is considered to form a layer of light reflective ink on the raised region and further draw the image on the raised region. With this configuration, for example, it is possible to appropriately prevent the color of the raised region from affecting the image.

Additionally, in this case, for a plurality of inkjet heads that eject inks of a plurality of colors used for forming the layered ink region, for example, if a dedicated inkjet head for forming the raised region is used, the cost will increase significantly to shorten the time of forming of the raised region. Against this background, the inventor of the present application has further studied and conceived of using, to form the raised region as well, a plurality of inkjet heads for color printing which are used when drawing an image. With such a configuration, for example, the raised region can be appropriately formed in a shorter time without excessively increasing the number of inkjet heads used. Additionally, this makes it possible to appropriately prevent extension of time required for the printing operation, for example.

Additionally, the inventor of the present application has found the characteristics necessary for obtaining such an effect through further diligent research, and has obtained the present invention. In order to solve the above problems, the present invention is a printing device that performs printing on a medium according to an inkjet method, the printing device including: a plurality of color ink heads that are a plurality of inkjet heads that eject different color inks; a light reflective ink head that is an inkjet head that ejects light reflective ink; and a controller that controls operation of the plurality of color inkjet heads and the light reflective ink head. The controller causes the plurality of color ink heads and the light reflective ink head to form, on the medium, a raised region that is a region where a plurality of ink layers overlap on the medium, a light reflecting region that is a region formed on the raised region using the light reflective ink, and an image region that is a region where an image is drawn by the plurality of color ink heads on the light reflecting region. At the time of forming the raised region, the controller causes at least two inkjet heads among the plurality of color ink heads to eject ink.

With such a configuration, for example, by forming the raised region using two or more inkjet heads, the time required for forming the raised region can be appropriately shortened. Additionally, in this case, by forming the raised region with a plurality of color ink heads, it is possible to prevent an increase in the number of inkjet heads included in the printing device. For this reason, with such a configuration, for example, when a raised shape is formed on the medium by forming a plurality of ink layers on top of one another, it is possible to appropriately prevent an increase in the time required for the printing operation.

Here, in this configuration, the printing device further includes, for example, a main scan driving unit. In this case, the main scan driving unit is a driving unit that causes the plurality of color ink heads and the light reflective ink head to perform, for example, a main scan of ejecting ink while moving relative to the medium in a preset main scanning direction. Then, in this case, in the main scan performed to form the raised region, the controller causes at least two inkjet heads among the plurality of color ink heads to eject ink to make the total amount of ink ejected in one main scan larger than a case where the main scan is performed using only one inkjet head. With this configuration, for example, the time required to form the raised region can be appropriately shortened. In this case, the total amount of ink is, for example, the total amount of ink ejected in one main scan per unit area. The amount of ink when main scan is performed using only one inkjet head is considered to be, for example, the maximum amount of ink that can be ejected by one inkjet head in one main scan.

Additionally, in this configuration, each of the plurality of color ink heads ejects a certain ink among a plurality of colors used as a basic color for color printing, for example. More specifically, in this configuration, the printing device includes, as the plurality of color ink heads, for example, an inkjet head that ejects yellow ink, an inkjet head that ejects magenta ink, an inkjet head that ejects cyan ink, and an inkjet head that ejects black ink. With this configuration, for example, an image region expressing a color image can be appropriately formed. Additionally, in this case, at the time of forming the raised region, the controller causes at least the four inkjet heads that eject yellow, magenta, cyan, and black ink to eject ink. With this configuration, for example, the time required to form the raised region can be more appropriately shortened.

Additionally, in this configuration, at least two inkjet heads used for forming the raised region are arranged side by side in the main scanning direction with their positions aligned in the sub scanning direction orthogonal to the main scanning direction, for example. With this configuration, for example, a plurality of inkjet heads can be used to appropriately form a raised region. More specifically, when the raised region is formed by using the four inkjet heads ejecting yellow, magenta, cyan, and black ink, it is preferable that these four inkjet heads be arranged side by side in the main scanning direction with their positions aligned in the sub scanning direction.

Further, when the light reflecting region and the image region are formed on the raised region as described above, if the color of the raised region becomes conspicuous when the image drawn in the image region is viewed, the print quality may deteriorate. In this regard, in principle, it seems that if the light reflecting region is formed in the same range as the raised region, for example, the color of the raised region can be appropriately concealed.

However, an error may occur in the position where ink dots are fixed due to various causes. Then, in this case, even if the light reflecting region is formed in the same range as the raised region by design, a positional deviation (off-registration) may occur between the two. For example, when a plurality of ink layers are formed on top of one another using an inkjet head, the outer edges of the ink layers tend to have a raised shape as compared with other parts. In particular, when a large amount of ink is ejected using a plurality of inkjet heads as in the case of forming the raised region, such a raised shape tends to be formed. In such a case, for example, even if the light reflecting region is formed in the same range as the raised region by design, the outer edge part of the raised region may not be covered by the light reflecting region. Additionally, as a result, the color of the raised region is viewed around the light reflecting region and the image region, and the print quality may be deteriorated.

Hence, it is preferable that the range of forming the light reflecting region is larger than the region for forming the raised region. More specifically, for example, when a range for ejecting ink by controlling any of the inkjet heads to form the raised region is defined as a raised region range, and a range for ejecting the light reflective ink by controlling the light reflective ink head to form the light reflecting region is defined as a light reflecting region range, at the time of forming the light reflecting region, the controller makes the light reflecting region range larger than the raised region range and causes the light reflective ink head to eject light reflective ink, for example. In this case, making the light reflecting region range larger than the raised region range can be considered as, for example, setting the light reflecting region range so as to include the raised region range. With this configuration, for example, a light reflecting region that covers the raised region can be formed more appropriately. As a result, for example, it is possible to appropriately prevent deterioration of print quality due to recognition of the color of the raised region.

Additionally, a configuration in which the light reflecting region range is made larger than the raised region range can be considered as, for example, a configuration in which the light reflecting region is formed so as to include the raised region. In this case, forming the light reflecting region so as to include the raised region can be considered as, for example, forming the light reflecting region by ejecting light reflective ink so that the light reflective ink is also ejected to the outside of the outer edge of the raised region. Further, in this configuration, for example, white ink or the like can be preferably used as the light reflective ink.

Additionally, in this configuration, the controller causes a plurality of color ink heads to form an image region on the basis of, for example, print data indicating an image to be printed. In this case, as the print data, for example, it is conceivable to use image data in which a raised image range, which is a range in which an image is drawn by a plurality of color ink heads on the raised region, is specified. In this case, it can be considered that, for example, the size of the image to be printed is determined by specifying the raised image range in the print data. Further, to cause a plurality of color ink heads to draw an image on the raised region means to cause it to draw an image on the raised region and the light reflecting region. Then, in this case, it is conceivable to set the raised region range and the light reflecting region range on the basis of the raised image range specified in the image data.

Additionally, in order to form the light reflecting region so as to include the raised region in the case of printing in which the entire image is raised, for example, it is conceivable to perform processing of reducing the size of the raised region or processing of enlarging the region other than the raised region. However, in this case, it is conceivable that if the processing of enlarging the region other than the raised region is performed, the influence on the appearance of the image will be large. More specifically, when performing processing of enlarging a region other than the raised region, for example, it is conceivable to enlarge the light reflecting region and the image region. In this case, for example, changing the size of the image drawn on the image region may increase the influence on the appearance of the image.

On the other hand, for example, when the light reflecting region is caused to include the raised region by reducing the size of the raised region, such a problem is unlikely to occur. For this reason, when forming the light reflecting region so as to include the raised region in the case of performing printing in which the entire image is raised, for example, it is conceivable to perform processing of reducing the size of the raised region. In this case, the controller sets the raised region range so that the raised region range is smaller than the raised image range, and sets the light reflecting region range according to the raised image range to make the light reflecting region range larger than the raised region range.

Additionally, depending on the required print quality or the like, regarding the way of superimposing the plurality of ink layers in the raised region, it is conceivable to make the forming range of the upper ink layers smaller than the forming range of the lower ink layers. In this case, at the time of forming the raised region, the controller sets a forming range of at least some of a plurality of ink layers forming the raised region to be smaller than a forming range of lower ink layers, for example. With this configuration, for example, the color of the raised region can be more appropriately concealed by the light reflecting region. Additionally, in this case, by shifting the outer edge positions of the ink layers, it is possible to improve the texture of a side surface part, for example. Additionally, in this case, it is preferable that the light reflecting region range be larger than the range of the ink layer formed in the widest range in the raised region, for example. With this configuration, for example, the color of the raised region can be more appropriately concealed by the light reflecting region.

Additionally, regarding the way of superimposing the plurality of ink layers in the raised region, in the case of making the forming range of the upper ink layers smaller than the forming range of the lower ink layers, it is conceivable to form the raised region so as to have a stepped edge, for example. The stepped edge of the raised region means, for example, that the outer edge positions of the ink layers forming the raised region are gradually varied to be located inward from the lower layer to the upper layer. In this case, for example, it is conceivable to vary the outer edge position every time a predetermined number of ink layers are formed. Additionally, in this case, the controller causes, for example, at least two inkjet heads among the plurality of color ink heads to form a raised region having a stepped edge. With this configuration, for example, the texture of the side surface part of the raised region can be improved more appropriately.

Additionally, in this case, for example, it is conceivable to gradually reduce the range of the plurality of ink layers forming the raised region each time one layer is formed. In this case, at the time of forming the raised region, for example, the controller, sets the forming range of the plurality of ink layers forming the raised region such that the forming range of an upper ink layer is smaller than the forming range of a lower ink layer. With this configuration, for example, the texture of the side surface part can be improved more appropriately.

Additionally, as a configuration of the present invention, it is conceivable to use a printing method or the like having the same characteristics as described above. In this case, too, the same effect as described above can be obtained, for example.

Effect of the Invention

According to the present invention, for example, when a raised shape is formed on a medium by forming a plurality of ink layers on top of one another, it is possible to appropriately prevent an increase in the time required for the printing operation.

DESCRIPTION OF EMBODIMENTS

Hereinafter, embodiments according to the present invention will be described with reference to the drawings.

First Embodiment

Figure 1:
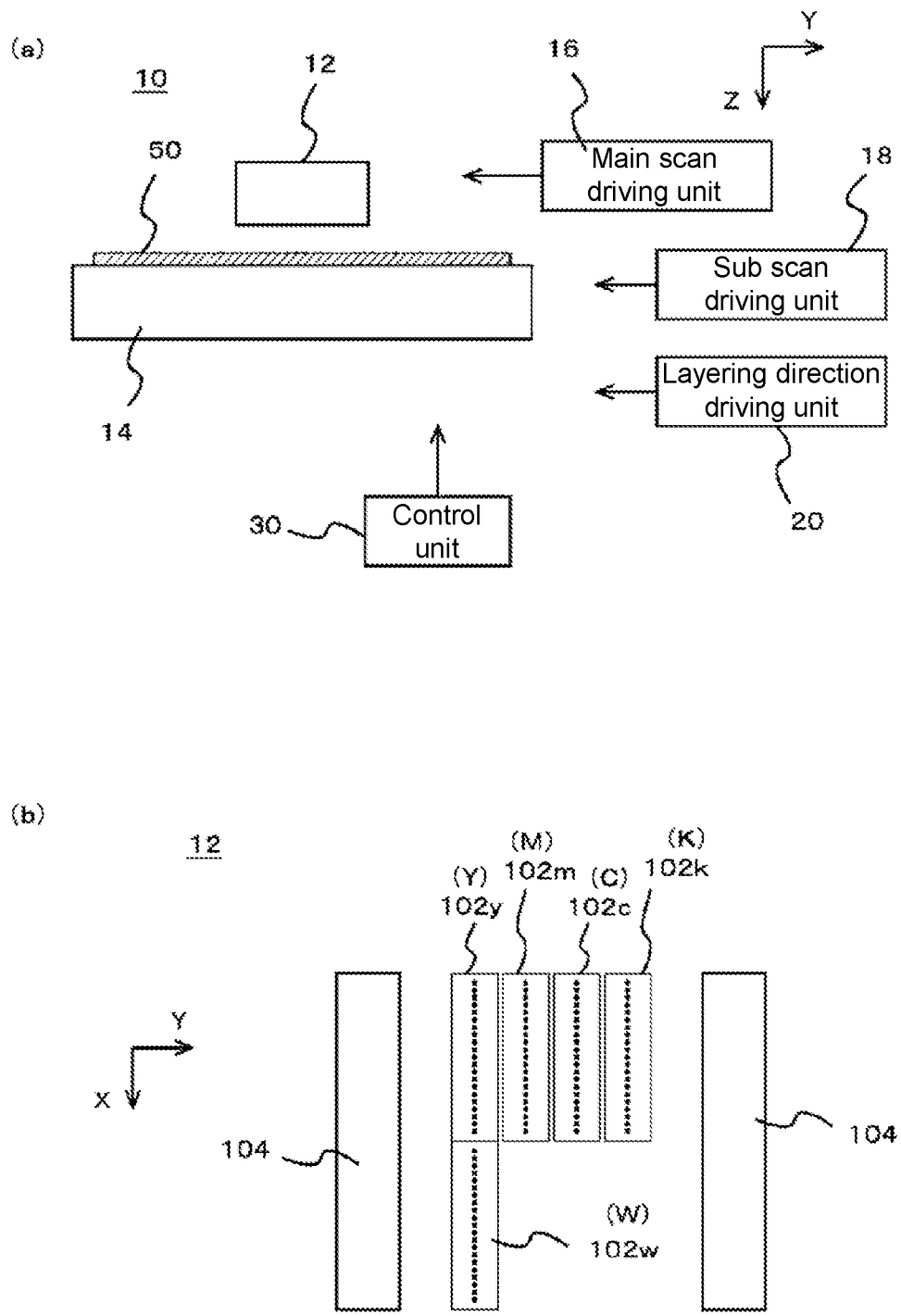
FIG. 1 is a diagram for describing a printing device 10 according to a first embodiment of the present invention. (a) of FIG. 1 shows an example of the configuration of a main part of the printing device 10. (b) of FIG. 1 shows an example of the configuration of a head unit 12 in the printing device 10.

FIG. 1 is a diagram for describing a printing device 10 according to a first embodiment of the present invention. (a) of FIG. 1 shows an example of the configuration of a main part of the printing device 10. Additionally, the printing device 10 may have the same or similar characteristics as a known printing device except for the points described below. For example, the printing device 10 may further include the same or similar configuration as a known printing device in addition to the configuration of the main part shown in FIG. 1.

In this example, the printing device 10 is an inkjet printer that prints on a medium 50 to be printed according to an inkjet method. Additionally, the printing device 10 ejects ink onto the medium 50 to form a plurality of ink layers on top of one another and form a raised shape on the medium 50. In this case, forming a raised shape on the medium 50 can be considered as, for example, forming a three-dimensional shape on the medium 50. Additionally, the operation of the printing device 10 can be considered as, for example, an operation of forming an irregularly raised shape on the medium 50, an operation of performing 2.5D (2.5-dimensional) printing, or the like. Further, in order to perform such a printing operation, the printing device 10 includes a head unit 12, a table unit 14, a main scan driving unit 16, a sub scan driving unit 18, a layering direction driving unit 20, and a controller 30.

The head unit 12 is configured to eject ink onto the medium 50. Characteristics of the head unit 12 will be described in more detail later. The table unit 14 is a table-shaped member that holds the medium 50 facing the head unit 12. In this example, the table unit 14 holds the medium 50 by placing the medium 50 on an upper surface of the table unit 14. The main scan driving unit 16 is a driving unit that causes an inkjet head in the head unit 12 to perform main scan. The sub scan driving unit 18 is a driving unit that causes the inkjet head in the head unit 12 to perform sub scan. In this case, main scan is an operation of ejecting ink while moving relative to the medium 50 in a preset main scanning direction. Sub scan is an operation of moving relative to the medium 50 in a sub scanning direction orthogonal to the main scanning direction. In this example, the main scanning direction is a direction parallel to the Y direction shown in the drawings. The sub scanning direction is the Y direction and a direction (X direction) orthogonal to the layering direction (Z direction) described below.

The layering direction driving unit 20 is a driving unit that moves the head unit 12 relative to the medium 50 in the layering direction in which the ink layers are formed on the medium 50. Additionally, in this example, the layering direction is a direction parallel to the vertical direction and orthogonal to the X direction and the Y direction. The layering direction driving unit 20 moves the head unit 12 relative to the medium 50 by, for example, changing the height of the table unit 14 according to the thickness of the ink layers formed on the medium 50.

More specifically, in the operation of forming the plurality of ink layers on the medium 50, the layering direction driving unit 20 moves the table unit 14 away from the head unit 12 each time a preset number of ink layers are formed, for example. With this configuration, for example, the distance between the ink layers being formed and the inkjet head in the head unit 12 can be maintained within a certain range. Additionally, it is conceivable to set the positional relationship between the medium 50 and the head unit 12 according to the height of the ink layers to be finally formed, for example. In this case, for example, before starting the printing operation, the position of the table unit 14 in the layering direction is adjusted according to the height of the ink layers to be finally formed. With this configuration, for example, the printing operation can be made faster by not changing the height of the table unit 14 during the printing operation.

The controller 30 is, for example, a part including the CPU of the printing device 10, and controls the operation of each part of the printing device 10. According to this example, for example, the controller 30 can make the printing device 10 perform the printing operation appropriately. Additionally, as a result, for example, by forming a plurality of ink layers on top of one another on the medium 50, a raised shape can be appropriately formed on the medium 50.

Subsequently, characteristics of the head unit 12 of this example will be described in more detail. (b) of FIG. 1 shows an example of the configuration of the head unit 12 in the printing device 10. In this example, the head unit 12 has a plurality of inkjet heads 102 that eject inks of different colors, and a plurality of ultraviolet light sources 104. Additionally, as the plurality of inkjet heads 102, as shown in (b) of FIG. 1, an inkjet head 102$y$, an inkjet head 102$m$, an inkjet head 102$c$, an inkjet head 102$k$ (hereinafter referred to as inkjet heads 102$y$ to 102$k$), and an inkjet head 102$w$ are provided. In this case, the inkjet head 102$y$ ejects yellow (color Y) ink. The inkjet head 102$m$ ejects magenta (color M) ink. The inkjet head 102$c$ ejects cyan (color C) ink. The inkjet head 102$k$ ejects black (color K) ink. Additionally, the inkjet head 102$w$ ejects white (white color, color W) ink.

In this case, by using yellow, magenta, cyan, and black ink, it is possible to appropriately express various colors. Additionally, in this example, as shown in (b) of FIG. 1, the inkjet heads 102$y$ to 102$k$ are arranged side by side in the main scanning direction with their positions aligned in the sub scanning direction. Additionally, the inkjet heads 102$y$ to 102$k$ are examples of a plurality of color ink heads that eject different colored inks. The yellow, magenta, cyan, and black ink are examples of process colors that are the basic colors for color printing.

Additionally, the inkjet head 102$w$ is arranged at a position adjacent to and shifted from the inkjet heads 102$y$ to 102$k$ in the sub scanning direction so as not to overlap with the inkjet heads 102$y$ to 102$k$ in the sub scanning direction. In this example, the inkjet head 102$w$ is an example of a light reflective ink head that ejects light reflective ink. Additionally, white ink ejected by the inkjet head 102$w$ is an example of light reflective ink.

Additionally, in this example, the inkjet heads 102$y$ to 102$k$ and the inkjet head 102$w$ eject ultraviolet-curable ink, which is an ink that cures in response to irradiation with ultraviolet rays. Each of the plurality of ultraviolet light sources 104 is means for emitting ultraviolet rays for curing ink, and is arranged on one side and the other side in the main scanning direction with respect to the inkjet heads 102$y$ to 102$k$ and the inkjet head 102$w$. With this configuration, the ultraviolet light sources 104 irradiate ink ejected from the inkjet heads with ultraviolet rays during main scan. The ultraviolet light source 104 can be considered as, for example, fixing means for fixing ink.

Note that in a modification of the printing device 10, it is conceivable to use inks other than the ultraviolet-curable ink in the inkjet heads 102$y$ to 102$k$ and the inkjet head 102$w$. In this case, it is preferable that the printing device 10 is provided with fixing means according to the characteristics of the ink.

Additionally, in this example, it is conceivable to use, as the head unit 12, the same or similar configuration as that of a head unit used in a known inkjet printer that prints a two-dimensional image, for example. In this case, a head unit used in a known inkjet printer that prints a two-dimensional image is a configuration that has inkjet heads 102$y$ to 102$k$, an inkjet head 102$w$, and a plurality of ultraviolet light sources 104 but does not have flattening means (e.g., roller) for flattening an ink layer, for example. Additionally, in a modification of the configuration of the head unit 12, the head unit 12 may further have, for example, flattening means or the like. In this case, it is conceivable to use, as the flattening means, the same or similar configuration as flattening means used in a head unit of a known shaping apparatus (3D printer) that forms a three-dimensional shaped object according to an inkjet method, for example.

Subsequently, printed matter obtained by a printing operation on the medium 50 will be described in more detail. In this case, printed matter is a print product created by performing a predetermined printing operation. Additionally, in this example, printed matter can be considered as, for example, the medium 50 or the like after printing.

Figure 2:
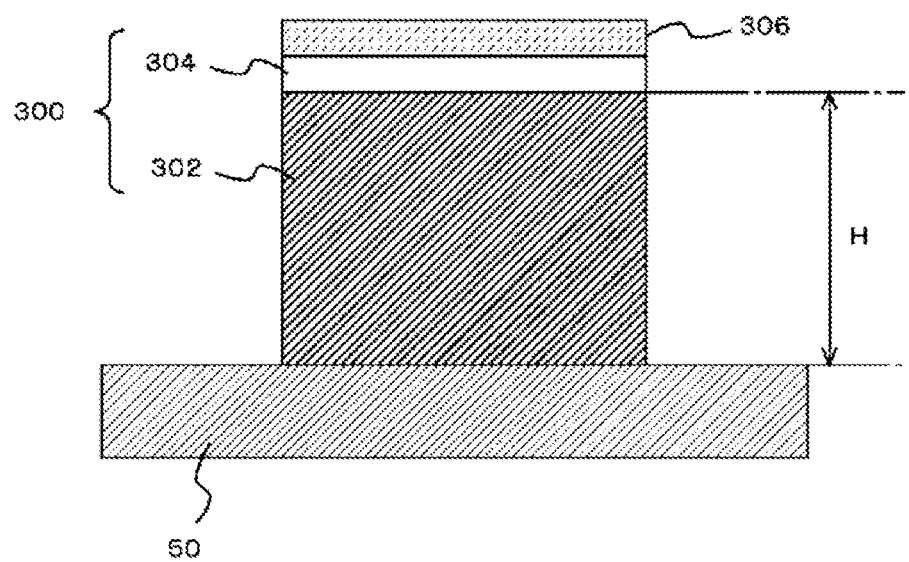
FIG. 2 is a diagram for describing printed matter.

FIG. 2 is a diagram for describing printed matter.

The printing device 10 ejects ink onto the medium 50 to form a plurality of ink layers on top of one another and form a raised shape on the medium 50. The printing device 10 controls operations of the inkjet heads 102$y$ to 102$k$ and the inkjet head 102$w$ (see FIG. 1) by the controller 30, so that a layered ink region 300 and a color layer 306 are formed on the medium 50.

In this case, the layered ink region 300 is a region where a plurality of ink layers overlap one another on the medium 50. The layered ink region 300 can be considered as, for example, a raised region that is a base of the color layer 306.

Additionally, the layered ink region 300 has a four-color region 302 and a white layer 304.

The four-color region 302 is a region formed by four color inks (yellow, magenta, cyan, and black ink) ejected by the inkjet heads 102y to 102k. Additionally, the four-color region 302 is a region in which a plurality of ink layers are superimposed to form a raised shape on the medium 50. The four-color region 302 can be considered as, for example, a region for forming a shape (Z shape) in the layering direction. Additionally, the four-color region 302 can be considered as, for example, a region in which ink layers are superimposed up to a designated height H.

The white layer 304 is a region formed on the four-color region 302 with white ink ejected by the inkjet head 102w. At the time of forming the white layer 304, the controller 30 causes the inkjet head 102w to eject white ink to form the white layer 304 so as to cover an upper surface of the four-color region 302. With this configuration, for example, by covering the upper surface of the four-color region 302 with the white layer 304, the color of the four-color region 302 can be concealed. Additionally, in this case, it can be considered that the white layer 304 functions as a background of the color layer 306 formed on the white layer 304.

The color layer 306 is a region on the layered ink region 300 where an image is drawn by the inkjet heads 102y to 102k. At the time of forming the color layer 306, the controller 30 causes each of the inkjet heads 102y to 102k to eject ink onto an ejection position set according to the image to be printed. With this configuration, for example, a color image can be appropriately drawn on the white layer 304. Additionally, in this case, by forming the color layer 306 on the four-color region 302 and the white layer 304, it is possible to draw an image raised from the surface of the medium 50. Additionally, the color layer 306 is also formed on the medium 50 in a part where the four-color region 302 and the color layer 306 are not formed, if necessary. With this configuration, for example, a partially raised image or the like can be drawn on the medium 50. For example, a partially or entirely raised image can be appropriately drawn on the medium 50.

Additionally, when creating a shape in the layering direction using the four-color region 302, by using four color inks of yellow, magenta, cyan, and black, for example, it is possible to create a shape in the layering direction in a shorter time than in the case of creating a shape in the layering direction using only one color ink. Additionally, in this case, since the shape in the layering direction can be formed at high speed, for example, it is possible to form a higher shape in the layering direction.

More specifically, in the operation of forming the four-color region 302, the controller 30 causes the inkjet heads 102y to 102k to repeatedly perform main scan at the same position, thereby forming a large number of ink layers on top of one another. Then, in this case, by forming the four-color region 302 using four inkjet heads (inkjet heads 102y to 102k), the time required to superimpose the ink layers up to the predetermined height H can be significantly shortened compared with the case of using only one inkjet head. Additionally, as described above, the inkjet heads 102y to 102k are arranged side by side in the main scanning direction with their positions aligned in the sub scanning direction. Then, in this case, in each main scan, the inkjet heads 102y to 102k can appropriately eject ink to the same position. Additionally, as a result, the time required to form the four-color region 302 having a predetermined height can be shortened to, for example, about ¼ as compared with the case where only one inkjet head 102 is used to form a shape having the same height in the layering direction. Additionally, in this case, the four-color region 302 is formed by using the inkjet heads 102y to 102k required for forming the color layer 306, instead of using a dedicated inkjet head to form the shape in the layering direction. This makes it possible to prevent an increase in the number of inkjet heads included in the printing device 10, for example.

Here, the four-color region 302 is formed by using four color inks of yellow, magenta, cyan, and black. Then, in this case, the color of the four-color region 302 is considered to be dark black. Additionally, in this case, the four-color region 302 can be considered to be a region or the like that is uniformly colored with a mixture of inks of a plurality of colors, unlike the image or the like drawn on the color layer 306, for example. Then, as described above, the color of the four-color region 302 is concealed by covering the upper surface of the four-color region 302 with the white layer 304. However, an error may occur in the position where ink dots are fixed due to various causes. In this case, the position where the ink dots are fixed is a position where ink dots formed by landed ink are fixed. Then, in this case, even if the white layer 304 is formed in the same range as the four-color region 302 by design, a positional deviation (off-registration) may occur between the two.

More specifically, as a result of actual confirmation by the inventor of the present application in various experiments and the like, when the layered ink region 300 and the color layer 306 are formed, in some cases, the four-color region 302 could not be sufficiently concealed by the white layer 304 due to a deviation between the position of the outer edge of the four-color region 302 and the position of the outer edge of the white layer 304. Then, in this case, the color of the four-color region 302 becomes conspicuous when the image is viewed, which may deteriorate the print quality. On the other hand, after a more diligent research, the inventor of the present application found that occurrence of such a problem can be appropriately prevented. Hereinafter, the configuration of printed matter created in this example will be described in detail.

Figure 3:
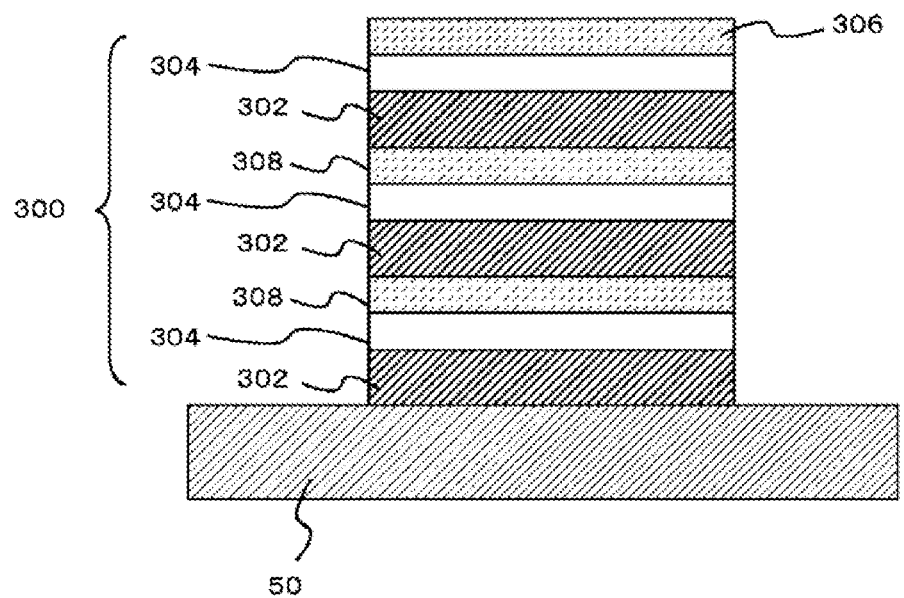
FIG. 3 is a diagram for describing the printed matter created in this example in more detail. (a) of FIG. 3 shows an example of the configuration of printed matter. (b) of FIG. 3 shows a modification of the printed matter created by using the printing device 10.
Figure 3:
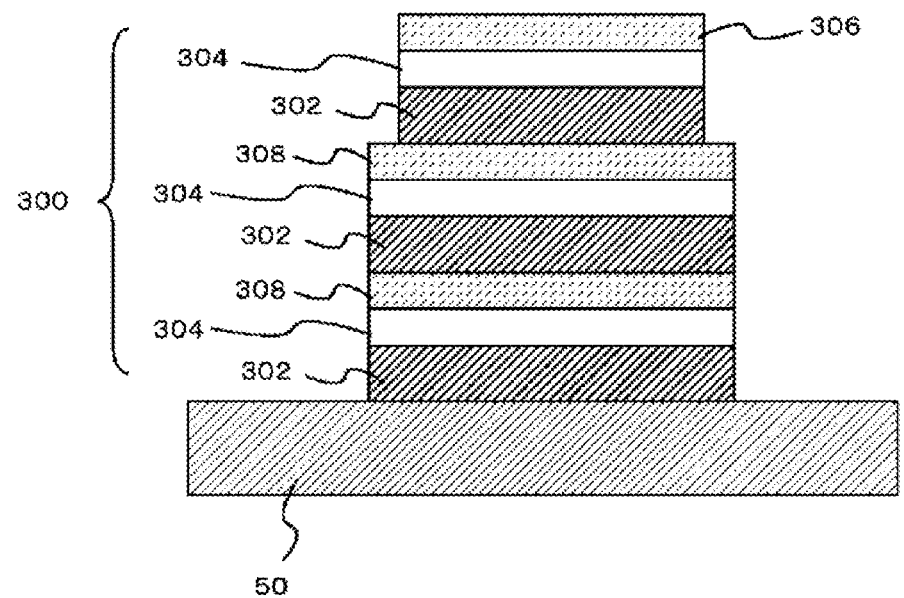

FIG. 3 is a diagram for describing printed matter created in this example in more detail. (a) of FIG. 3 shows an example of the configuration of printed matter. Additionally, except for the points described below, configurations in FIG. 3 with the same reference numerals as those in FIGS. 1 and 2 may have the same or similar characteristics as the configurations in FIG. 2. Additionally, for convenience of illustration, FIG. 3 and each drawing described below show an example in which a relatively small number of ink layers are formed on the medium 50. However, at the time of actual printing, it is conceivable to superimpose more ink layers according to the desired height.

In this example, too, the printing device 10 controls operations of the inkjet heads 102y to 102k and the inkjet head 102w (see FIG. 1) by the controller 30, so that the layered ink region 300 and the color layer 306 are formed on the medium 50. However, in this case, the configuration of the layered ink region 300 is different from the example shown in FIG. 2.

More specifically, in this example, the printing device 10 forms an ink layer including a plurality of four-color regions 302, a plurality of white layers 304, and a plurality of color layers 308 as the layered ink region 300. In this case, each four-color region 302 is a region formed by four color inks ejected by the inkjet heads 102y to 102k. The controller 30 causes each of the inkjet heads 102y to 102k to eject ink and form the four-color region 302 using yellow, magenta, cyan, and black ink. Additionally, in this example, each of the plurality of four-color regions 302 is an example of a colored region in the layered ink region 300. In this case, a colored region in the layered ink region 300 is a colored region formed by causing at least two inkjet heads out of the inkjet heads 102y to 102k to eject ink.

Additionally, in this example, each four-color region 302 is not a region in which a plurality of ink layers are superimposed, but a region composed of one ink layer. In this case, one ink layer can be considered as, for example, an ink layer formed by performing main scan and sub scan so that the print density by one inkjet head becomes 100% at the maximum. Print density can be considered as, for example, the density of ink ejected onto a unit area in a unit time. Additionally, a print density of 100% can be considered as, for example, the print density when ink is ejected once to each ejection position set according to the print resolution. Alternatively, one ink layer can be considered as, for example, an ink layer formed by performing main scan in the same manner as when the color layer 306 is formed. In this case, performing main scan in the same manner as when the color layer 306 is formed can be considered as, for example, performing main scan on the same position for the same number of times as when the color layer 306 is formed. Alternatively, one ink layer can be considered as, for example, an ink layer formed by performing main scan for the pass number specified as a setting of a printing operation. Additionally, at the time of forming each of the four-color regions 302 in this example, the controller 30 causes the inkjet heads 102y to 102k to eject ink at the same print density. More specifically, at the time of forming each of the four-color regions 302, the controller 30 causes each of the inkjet heads 102y to 102k to eject ink at a print density of 100%.

Additionally, in this example, the thickness of one four-color region 302 may be, for example, about 100 μm. Then, the plurality of four-color regions 302 are superimposed with the white layer 304 and the color layer 306 sandwiched therebetween, for example, as shown in FIG. 3. Additionally, this configuration is an example of a configuration in which the four-color regions 302 are superimposed with at least the white layer 304 sandwiched therebetween. Additionally, in a modification of the configuration of the layered ink region 300, it is conceivable to form a plurality of ink layers as the four-color regions 302 superimposed with the white layer 304 interposed therebetween.

Each of the plurality of white layers 304 is a region formed with white ink ejected by the inkjet head 102w. The controller 30 causes the inkjet head 102w to eject ink to make the printing device 10 form the white layer 304 using white ink. Additionally, in this example, each of the plurality of white layers 304 is an example of a light reflecting region, and is formed on each of the plurality of four-color regions 302. Additionally, in this example, the printing device 10 also forms one ink layer as each white layer 304 formed between the four-color regions 302.

Each of the plurality of color layers 308 is a region colored with colors matching an image drawn in the color layer 306, and is formed with color inks ejected by the inkjet heads 102y to 102k. The controller 30 causes each of the inkjet heads 102y to 102k to eject ink to make the printing device 10 form the color layer 308 using yellow, magenta, cyan, and black ink. In this case, coloring with colors matching the image is, for example, not coloring uniformly with a predetermined color as in the four-color region 302, but coloring with colors recognized as colors related to the image of the color layer 306 when the image is viewed.

More specifically, it is conceivable to form, as each color layer 308, for example, an ink layer showing the same image as the color layer 306.

Further, in this example, each of the plurality of color layers 308 is an example of a region to be colored in the layered ink region 300, and is formed on at least some of the white layers 304 in the layered ink region 300. More specifically, as shown in FIG. 3, in this example, the color layer 306 is formed on the layered ink region 300. Then, in this case, if the color layer 308 is also formed on the uppermost part of the layered ink region 300, the layer immediately below the color layer 306 is the color layer 308 instead of the white layer 304. For this reason, in this example, the color layer 308 is formed on the white layers 304 other than the top white layer 304 among the plurality of white layers 304 in the layered ink region 300.

The color layer 306 is a region on the layered ink region 300 where an image is drawn by the inkjet heads 102y to 102k. In this example, the color layer 306 is an example of an image region. The controller 30 causes each of the inkjet heads 102y to 102k to eject ink to make the printing device 10 form the color layer 306 using yellow, magenta, cyan, and black ink. In this example, too, by forming the color layer 306 on the layered ink region 300, it is possible to draw an image raised from the surface of the medium 50.

Additionally, in the case of this example, too, in the operation of forming the layered ink region 300, by using a plurality of inkjet heads (inkjet heads 102y to 102k) when forming the four-color region 302 forming a part of the layered ink region 300, similarly to the example of FIG. 2, for example, the time required for forming the layered ink region 300 can be appropriately shortened. Additionally, in this case, focusing on the height (thickness) of the ink layers that can be formed in the same time when forming the four-color region 302, it is considered to be about four times as high as the case where only one inkjet head is used. For this reason, according to this example, it can also be considered that the height of the layered ink region 300 that can be formed within a predetermined printing time is increased, for example. More specifically, for example, it is conceivable to set the maximum height at which the ink layers are superimposed to about 2.0 mm or more (e.g., about 1.5 mm to 2.5 mm) in the printing device 10 of this example.

Additionally, when focusing on the point of shortening the time required for forming the four-color region 302 and considering the characteristics required for that purpose in a more generalized manner, it can be considered that a characteristic of this example is that at least two of the inkjet heads 102y to 102k are used to form the four-color region 302, for example. In this case, in each main scan performed to form the four-color region 302, the controller 30 causes at least two of the inkjet heads 102y to 102k to eject ink to make the total amount of ink ejected in one main scan larger than a case where the main scan is performed using only one inkjet head. With this configuration, for example, the time required to form the layered ink region 300 can be appropriately shortened. Additionally, in this case, as described above with reference to FIG. 1, it can be considered that the four-color region 302 is preferably formed with a plurality of inkjet heads arranged side by side in the main scanning direction with their positions aligned in the sub scanning direction. Additionally, in this example, by forming the four-color region 302 with the inkjet heads 102y to 102k, for example, it is possible to prevent an increase in the number of inkjet heads included in the printing device 10.

Further, in this example, by forming a plurality of four-color regions 302 so as to sandwich the white layer 304 and the color layer 308 between them, for example, the four-color region 302 can be more appropriately covered with the white layer 304 or the like. Additionally, with this configuration, for example, it is possible to appropriately prevent the influence of the color of the four-color region 302 when viewing the image in the color layer 306.

Regarding this point, for example, when forming a high layered ink region 300, if the four-color region 302 is formed by a large number of ink layers as described above, it is considered that the problem of off-registration is likely to occur. More specifically, when a plurality of ink layers are formed on top of one another using an inkjet head, for example, the outer edges of the ink layers tend to have a raised shape as compared with other parts. In particular, when a large amount of ink is ejected using a plurality of inkjet heads as in the case of forming the four-color region 302, such a raised shape tends to be formed due to the influence of surface tension according to the characteristics of the ink. Additionally, as a result, the shape of a side surface of the four-color region 302 may be tapered. Then, in this case, if the swelling is prominent, it may cause off-registration.

On the other hand, in this example, the white layer 304 is formed on the four-color region 302 forming a part of the layered ink region 300 every time the four-color region 302 is formed. With this configuration, for example, the white layer 304 can appropriately cover the upper surface of the four-color region 302 before the outer edge of the four-color region 302 swells prominently. Additionally, in this case, by forming the white layer 304, which is formed with less ink than when forming the four-color region 302, on the four-color region 302, the uppermost ink layer at that time can be changed from the uppermost ink layer immediately after forming the four-color region 302. Additionally, as a result, it is possible to curb off-registration as compared with the case where the four-color region 302 is formed by a large number of ink layers, for example. For this reason, according to this example, off-registration or the like can be curbed even when a high layered ink region 300 including a large number of four-color regions 302 is formed. Additionally, as a result, for example, when a raised shape is formed on the medium 50 by forming a plurality of ink layers on top of one another, it is possible to more appropriately prevent an increase in the time required for the printing operation. Additionally, in this example, by further forming the color layer 308 on the white layer 304 between the four-color regions 302, for example, the influence of the color of the four-color region 302 when viewing the image in the color layer 306 can be prevented more appropriately.

Additionally, as described above, in the head unit 12 (see FIG. 1) of this example, the inkjet head 102w is arranged at a position adjacent to and shifted from the inkjet heads 102y to 102k in the sub scanning direction so as not to overlap with the inkjet heads 102y to 102k in the sub scanning direction. Then, such a configuration can be considered as, for example, a suitable configuration in a case of forming the four-color region 302 and the white layer 304 on top of one another as in this example.

More specifically, in this example, the controller 30 includes the main scan driving unit 16 and the sub scan driving unit 18 (see FIG. 1), so that main scan is repeatedly performed with sub scan interposed therebetween. Additionally, in this case, the inkjet heads 102y to 102k and the inkjet head 102w are caused to perform sub scan so that main scan is performed by the inkjet heads 102y to 102k and then main scan is performed by the inkjet head 102w. With this configuration, for example, the white layer 304 can also be appropriately formed during the main scanning and the sub scanning performed to form the four-color region 302 at each position where the four-color region 302 and the white layer 304 should be formed on top of one another. Additionally, as a result, for example, the layered ink region 300 having the four-color region 302 and the white layer 304 can be appropriately formed. Additionally, in this case, focusing on the operation of the controller 30, the controller 30 causes the inkjet heads 102y to 102k and the inkjet head 102w to form a plurality of four-color regions 302 and a plurality of white layers 304, so that the four-color regions 302 are superimposed with at least the white layer 304 interposed therebetween.

Additionally, in order to reduce the influence of the swelling of the outer edge of the ink layer, for example, as shown in (b) of FIG. 3, regarding the way of superimposing the plurality of ink layers in the layered ink region 300, it is conceivable to make the forming range of the upper ink layers smaller than the forming range of the lower ink layers. (b) of FIG. 3 is a diagram showing a modification of printed matter created by using the printing device 10, and shows an example of the configuration of ink layers formed on a medium 50.

At the time of forming a layered ink region 300 in this modification, a controller 30 sets a forming range of at least some of a plurality of ink layers forming the layered ink region 300 to be smaller than a forming range of lower ink layers. With this configuration, for example, since the outer edge positions of the ink layers are shifted and the raised parts thereof do not overlap, the influence of the raised outer edges of the ink layers can be reduced. Additionally, in this case, for example, by shifting the outer edge positions of the ink layers, it is possible to improve the texture of a side surface part.

More specifically, in this modification, as shown in FIG. 3, among the plurality of four-color regions 302 in the layered ink region 300, the range of forming some of the upper four-color regions 302 is set narrower than that of the other lower four-color regions 302. Additionally, the range of forming the white layer 304, the color layer 308, and the color layer 306 on each of the four-color regions 302 is set to the same range as the range in which each four-color region 302 is formed. With this configuration, for example, it is possible to appropriately create printed matter in which the range of forming some of the four-color regions 302 is set differently than that of other four-color regions 302.

Additionally, in this case, it is conceivable to appropriately adjust images drawn on the color layer 306 and the color layer 308 according to the range of forming the layers. More specifically, as described above, it is conceivable to form, as each color layer 308 included in the layered ink region 300, an ink layer showing the same image as the color layer 306 formed on the layered ink region 300, for example. Then, in this case, regarding the color layer 306 and the color layer 308 having different ranges, it is conceivable to form the layers such that the same images are included in the same range (common range). With this configuration, for example, when the range of forming some of the four-color regions 302 is set differently than that of other four-color regions 302, the color layer 308 can be appropriately formed between the four-color regions 302.

Additionally, as a configuration where the range of forming some of the four-color regions 302 is set differently than that of other four-color regions 302, for example, a configuration in which the layered ink region 300 has a stepped edge is conceivable. In this case, the stepped edge means that, for example, the outer edge positions of ink layers forming the layered ink region 300 are gradually varied to be located inward from the lower layer toward the upper layer. In this case, for example, it is conceivable to vary the outer edge position every time a predetermined number of ink layers are formed.

Figure 4:
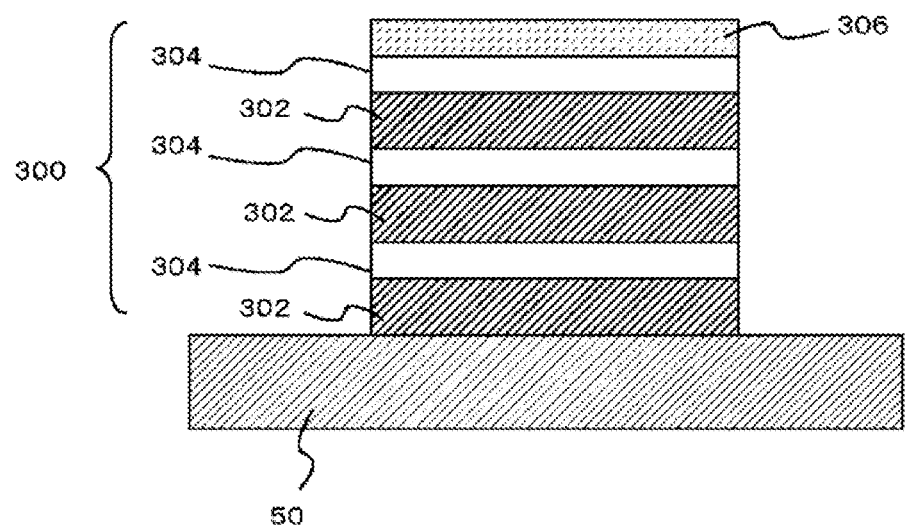
FIG. 4 is a diagram showing another modification of the printed matter. (a) of FIG. 4 shows the configuration of ink layers formed on a medium 50 in this modification. (b) of FIG. 4 shows the configuration of ink layers formed on a medium 50 in another modification of the printed matter.
Figure 4:
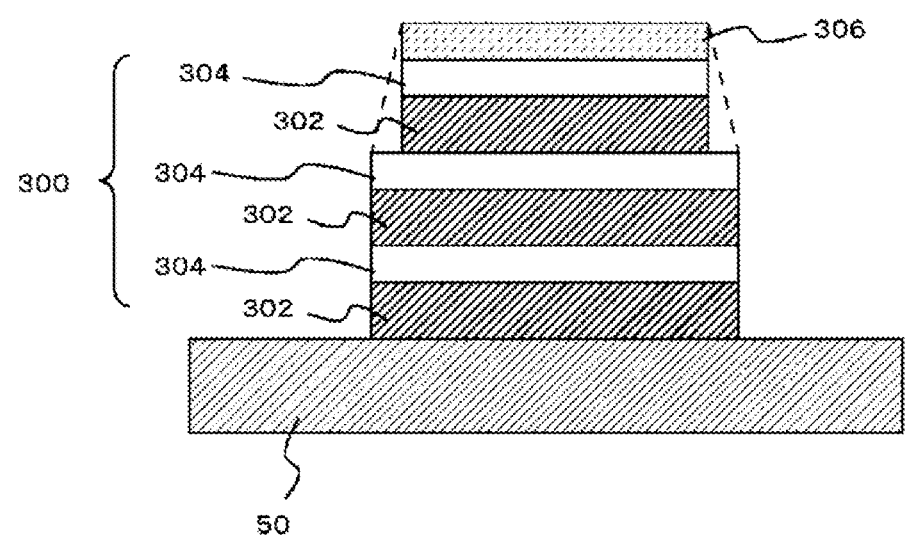

Additionally, in another modification of the printed matter, it is conceivable to omit the color layer 308 from between the four-color regions 302. FIG. 4 is a diagram showing another modification of the printed matter. Except for the points described below, configurations in FIG. 4 with the same reference numerals as those in FIGS. 1 to 3 may have the same or similar characteristics as the configurations in FIGS. 1 to 3.

(a) of FIG. 4 shows the configuration of ink layers formed on a medium 50 in this modification. In this modification, too, a printing device 10 forms a layered ink region 300 and a color layer 306 on the medium 50. Additionally, as the layered ink region 300, an ink layer including a plurality of four-color regions 302 and a plurality of white layers 304 is formed. The configuration of the layered ink region 300 in this modification can be considered as, for example, a configuration in which the color layer 308 (see FIG. 3) is removed from the layered ink region 300 in the configuration shown in (a) of FIG. 3.

In this modification, too, by forming the layered ink region 300 including the plurality of four-color regions 302, the time required for forming the layered ink region 300 can be appropriately shortened. Additionally, in this case, for example, instead of forming the four-color region 302 by a large number of ink layers, each time a four-color region 302 forming a part of the layered ink region 300 is formed, the white layer 304 is formed on the four-color region 302. With this configuration, it is possible to curb off-registration as compared with the case where the four-color region 302 is formed by a large number of ink layers. For this reason, in this modification, too, for example, when a raised shape is formed on the medium 50 by forming a plurality of ink layers on top of one another, it is possible to more appropriately prevent an increase in the time required for the printing operation.

Additionally, even when the color layer 308 is not formed between the four-color regions 302, for example, as shown in (b) of FIG. 4, regarding the way of superimposing the plurality of ink layers in the layered ink region 300, the forming range of the upper ink layers may be made smaller than the forming range of the lower ink layers. (b) of FIG. 4 shows the configuration of ink layers formed on a medium 50 in another modification of the printed matter.

A layered ink region 300 in this modification can be considered as, for example, a configuration in which the color layer 308 is removed from the layered ink region 300 in the configuration shown in (b) of FIG. 3. Additionally, in this case, it is conceivable to form a color layer 306 formed on the layered ink region 300 in a wider range than a four-color region 302 (uppermost four-color region 302) formed on the uppermost layer in the layered ink region 300. Additionally, in this case, it is conceivable to form the color layer 306 such that it covers not only the uppermost four-color region 302 and white layer 304, but also other parts. More specifically, in this case, it is conceivable to form the color layer 306 in the same range as, for example, the four-color region 302 (e.g., lowermost four-color region 302) formed in the widest range in the layered ink region 300.

With this configuration, for example, as indicated by a broken line in (b) of FIG. 4, ink ejected from the inkjet heads 102y to 102k (FIG. 1) can also be applied to parts of the layered ink region 300 outside the uppermost four-color region 302. Widening of the range of forming the color layer 306 will be described in more detail later. Additionally, depending on the required printing quality and the like, the range of forming the color layer 306 may be set to the same range as the range of forming the uppermost four-color region 302.

Figure 5:
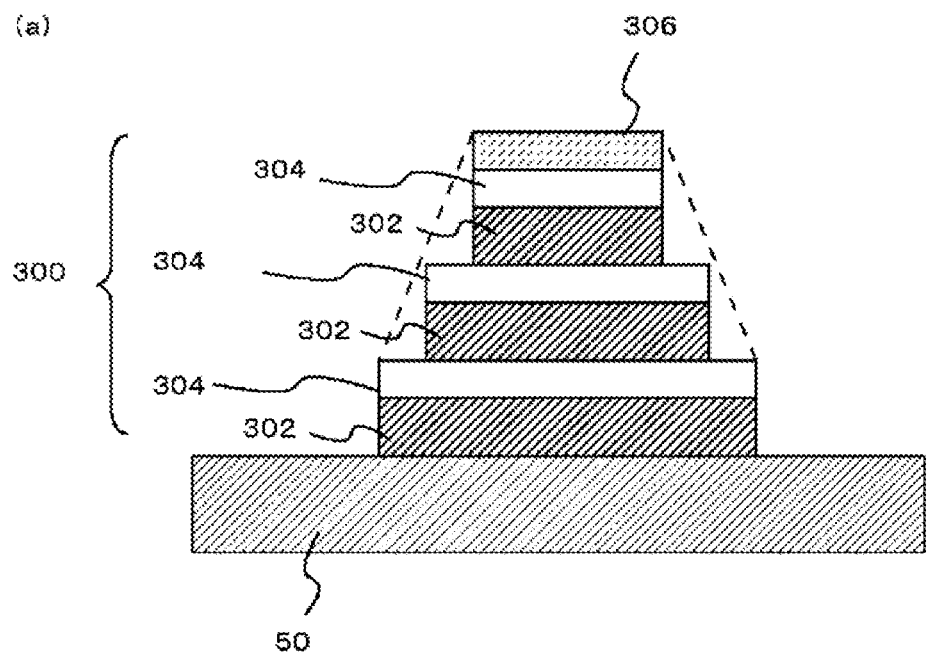
FIG. 5 is a diagram for describing a range of forming a color layer 306. (a) of FIG. 5 shows the configuration of ink layers formed on a medium 50 in another modification of the printed matter. (b) of FIG. 5 shows an example of the range of forming ink layers when a layered ink region 300 and a color layer 306 are formed.
Figure 5:
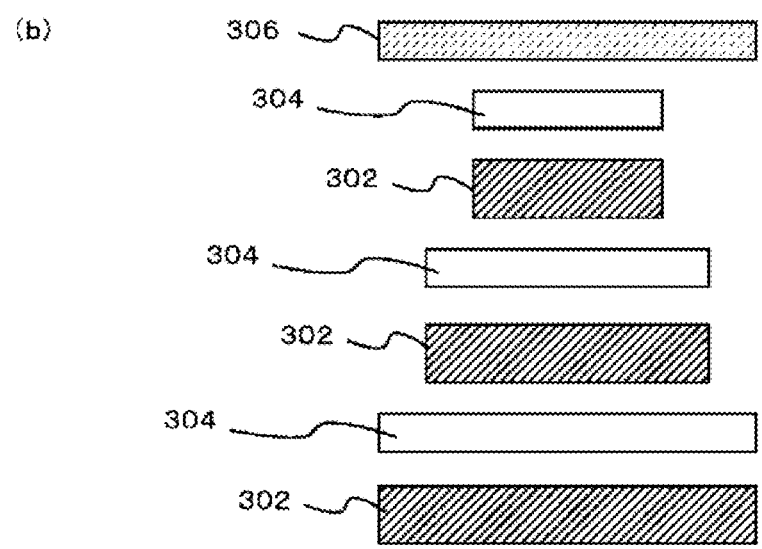

Subsequently, the range of forming the color layer 306 will be described in more detail. FIG. 5 is a diagram for describing the range of forming the color layer 306, and shows an example of the range of forming the color layer 306 on the layered ink region 300 in a case where the layered ink region 300 is formed by superimposing the four-color regions 302 with only the white layer 304 interposed therebetween. Additionally, except for the points described below, configurations in FIG. 5 with the same reference numerals as those in FIGS. 1 to 4 may have the same or similar characteristics as the configurations in FIGS. 1 to 4.

(a) of FIG. 5 shows the configuration of ink layers formed on a medium 50 in another modification of the printed matter. (b) of FIG. 5 is a diagram showing an example of the range of forming ink layers when a layered ink region 300 and a color layer 306 are formed, and shows an example of the range of forming ink layers when the layered ink region 300 and the color layer 306 are formed as shown in (a) of FIG. 5. In this case, the range of forming the ink layers can be considered as, for example, the range for ejecting ink by the inkjet heads used for forming the ink layers. Additionally, (b) of FIG. 5 can be considered as, for example, a diagram showing a plurality of four-color regions 302 and a plurality of white layers 304 forming the layered ink region 300 one by one, and showing the color layer 306 including a part thereof for ejecting ink to positions other than the four-color region 302 and the white layer 304, immediately below the color layer 306.

In this modification, the layered ink region 300 is formed so as to have a stepped edge as shown in (a) of FIG. 5. In this case, as shown in (b) of FIG. 5, it is conceivable to set the range of forming each of the plurality of four-color regions 302 in the layered ink region 300 such that the range becomes narrower toward the upper side in the layering direction. Additionally, it is conceivable to set the range of forming each of the plurality of white layers 304 in the layered ink region 300 such that the range is the same as the range of forming the four-color region 302 immediately below the white layer 304.

On the other hand, as described above in relation to the configuration shown in FIG. 4, it is conceivable to form the color layer 306 such that it covers not only the uppermost four-color region 302 and white layer 304, but also other parts. Then, in this case, as shown in (b) of FIG. 5, the range of forming the ink layer corresponding to the color layer 306 becomes wider than the range of forming the ink layer corresponding to the uppermost four-color region 302 and white layer 304. More specifically, in this modification, the range of forming the ink layer corresponding to the color layer 306 is the same as the range of forming the lowermost four-color region 302, which is the widest four-color region 302.

With this configuration, for example, as indicated by a broken line in (a) of FIG. 5, ink ejected from the inkjet heads 102y to 102k (see FIG. 1) can also be applied to parts of the layered ink region 300 outside the uppermost four-color region 302. As a result, for example, it is possible to appropriately prevent the color of the white layer 304 from being excessively conspicuous around the color layer 306, and to perform high-quality printing more appropriately.

Additionally, in another modification of the printed matter, for example, it is conceivable to set the range of forming the uppermost white layer 304 (white layer 304 immediately below color layer 306) in the layered ink region 300 to a wide range as in the case of the color layer 306. With this configuration, for example, white ink can be applied to side surfaces of a plurality of four-color regions 302 in the layered ink region 300. Additionally, for example, the color of the four-color region 302 can be more appropriately concealed.

Subsequently, supplementary explanations and the like regarding each configuration described above will be given. In FIGS. 2 to 5, for convenience of illustration, the layered ink region 300 has a shape with a flat upper surface. However, as shown in FIG. 6, for example, it is conceivable to form the layered ink region 300 in a shape having different heights depending on the position.

Figure 6:
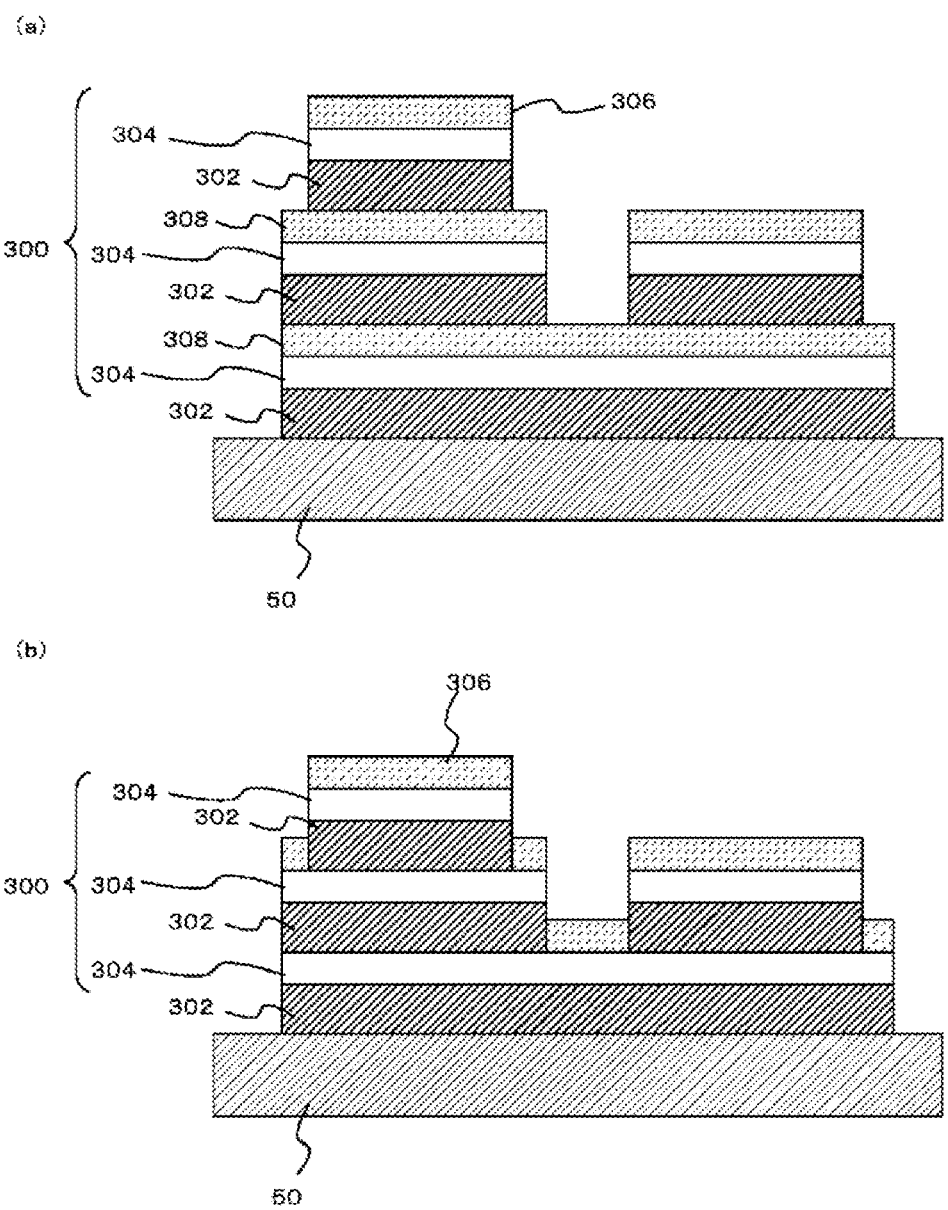
FIG. 6 is a diagram for describing the shape of a layered ink region 300 in more detail. (a) of FIG. 6 shows an example of a layered ink region 300 and the like having different heights depending on the position in a case where a white layer 304 and a color layer 308 are formed between four-color regions 302. (b) of FIG. 6 shows an example of the layered ink region 300 and the like having different heights depending on the position in a case where only the white layer 304 is formed between the four-color regions 302.

FIG. 6 is a diagram for describing the shape of the layered ink region 300 in more detail. (a) of FIG. 6 shows an example of printed matter including a layered ink region 300 having a shape with different heights depending on the position in a case where a white layer 304 and a color layer 308 are formed between four-color regions 302. (b) of FIG. 6 shows an example of the printed matter including a layered ink region 300 having a shape with different heights depending on the position in a case where only a white layer 304 is formed between four-color regions 302.

In these cases, the layered ink region 300 can be considered as, for example, a region having different heights depending on the position on the medium 50. Additionally, the layered ink region 300 can be considered as, for example, a region that is raised in an irregular shape. Even when such a layered ink region 300 is formed, by forming the white layer 304 or the like between the four-color regions 302, it is possible to curb off-registration.

Additionally, in this case, the range of forming the color layer 306 may be appropriately set according to whether or not to form the color layer 308 between the four-color regions 302. More specifically, in a case where the white layer 304 and the color layer 308 are formed between the four-color regions 302, for example, as shown in (a) of FIG. 6, considering that the four-color region 302 formed at the highest position in the entire layered ink region 300 is the uppermost four-color region 302, it is conceivable to form the white layer 304 and the color layer 308 on the four-color region 302 other than the uppermost four-color region 302, and form the white layer 304 and the color layer 306 on the uppermost four-color region 302.

On the other hand, in a case where only the white layer 304 is formed between the four-color regions 302, for example, as shown in (b) of FIG. 6, considering the uppermost four-color region 302 formed at each position in a plane orthogonal to the layering direction, it is conceivable to form the white layer 304 and the color layer 306 on the uppermost four-color region 302. Additionally, in this case, for example, as described above with reference to (b) of FIG. 5, it is conceivable to set the range of forming the ink layer corresponding to the color layer 306 to the same range as the range of forming the lowermost four-color region 302 to form the color layer 306 on the uppermost four-color region 302 at each position.

Additionally, in the above description, regarding the four-color region 302, a case where the four-color region 302 is formed mainly by using four color inks of yellow, magenta, cyan, and black has been described. In this case, the inkjet heads 102$y$ to 102$k$ can be considered as an example of at least two inkjet heads used for forming the color layer 306, for example. Additionally, in the modification of the method of forming the four-color region 302, the four-color region 302 may be formed by further using inks other than these four colors. In this case, for example, it is conceivable to further use white ink to form the four-color region 302. Additionally, as described above, when the four-color region 302 is formed, it is not always necessary to use inks of all four colors of yellow, magenta, cyan, and black, and it is possible to use only some of the colors. In this case, too, for example, by forming the four-color region 302 using inks of two or more colors, the layered ink region 300 can be appropriately formed in a short time.

As described above, the printing device 10 according to the first embodiment includes the following configurations.
(1) A printing device 10 prints on a medium 50 according to an inkjet method.

The printing device 10 includes a plurality of inkjet heads 102$y$ to 102$k$ (color ink heads) that eject different color inks;
an inkjet head 102$w$ (light reflective ink head) that ejects white ink (light reflective ink); and
a controller 30 that controls operation of the plurality of inkjet heads 102$y$ to 102$k$ and the inkjet head 102$w$.
The controller 30 causes the plurality of inkjet heads 102$y$ to
102$k$ and the inkjet head 102$w$ to form, on the medium 50,
a layered ink region 300 formed by superimposing a plurality of ink layers, and
a color layer 306 (image region) that is a region on which an image is drawn by the plurality of inkjet heads 102$y$ to 102$k$ on the layered ink region 300.
The layered ink region 300 is a region including
a plurality of four-color regions 302 (colored regions) that are colored regions formed by causing at least two inkjet heads among the plurality of inkjet heads 102$y$ to 102$k$ to eject ink, and
a plurality of white layers 304 (light reflecting regions) that are regions formed on the four-color region 302 using white ink.

The printing device 10 uses the plurality of inkjet heads 102$y$ to 102$k$ when forming the four-color region 302 forming a part of the layered ink region 300. As a result, the time for forming the layered ink region 300 can be shortened, and the time required for printing can be reduced.

(2) The controller 30 causes the plurality of inkjet heads 102$y$ to 102$k$ and the inkjet head 102$w$ to form the plurality of four-color regions 302 and the plurality of white layers 304, so that the four-color regions 302 are superimposed with at least the white layer 304 interposed therebetween.

With such a configuration, the white layer 304 can cover the four-color region 302 more appropriately, and it is possible to appropriately prevent the influence of the color of the four-color region 302 when an image is viewed in the color layer 306.

(3) The controller 30 causes the plurality of inkjet heads 102$y$ to 102$k$ to form a color layer 308 (region to be colored) that is a region to be colored with a color matching the image drawn on the color layer 306, on at least some of the white layers 304 in the layered ink region 300.

By forming the color layer 308 with the plurality of inkjet heads 102$y$ to 102$k$, it is possible to prevent an increase in the number of inkjet heads included in the printing device 10. Additionally, by forming the color layer 308 that is the region to be colored in the layered ink region 300, the influence of the color of the four-color region 302 when viewing the image in the color layer 306 that is the image region can be prevented more accurately.

(4) The printing device 10 includes, as the plurality of inkjet heads 102$y$ to 102$k$, an inkjet head 102y that ejects yellow ink,
an inkjet head 102m that ejects magenta ink,
an inkjet head 102c that ejects cyan ink, and
an inkjet head 102k that ejects black ink.

At the time of forming the four-color region 302, the controller 30 causes at least the four inkjet heads 102y to 102k that eject yellow, magenta, cyan, and black ink to eject ink.

With this configuration, the time required to form the layered ink region 300 can be shortened more appropriately.

(5) The printing device 10 further includes a main scan driving unit 16. The main scan driving unit 16 causes the plurality of inkjet heads 102y to 102k and the inkjet head 102w to perform main scan of ejecting ink while moving relative to the medium 50 in a preset main scanning direction.

At least two inkjet heads used for forming the four-color region 302 are arranged side by side in the main scanning direction with their positions aligned in the sub scanning direction orthogonal to the main scanning direction.

With this configuration, the four-color region 302 can be appropriately formed by using the plurality of inkjet heads 102y to 102k. More specifically, when the four-color region 302 is formed by using the four inkjet heads 102y to 102k ejecting yellow, magenta, cyan, and black ink, it is preferable that these four inkjet heads 102y to 102k be arranged side by side in the main scanning direction with their positions aligned in the sub scanning direction.

(6) The printing device 10 further includes a sub scan driving unit 18. The sub scan driving unit 18 causes the plurality of inkjet heads 102y to 102k and the inkjet head 102w to perform sub scan of moving relative to the medium 50 in a sub scanning direction.

The inkjet head 102w is arranged so as to be shifted from at least two inkjet heads used for forming the four-color region 302 in the sub scanning direction.

The controller 30 controls the main scan driving unit 16 and the sub scan driving unit 18 so that main scan is repeatedly performed with sub scan interposed therebetween. As a result, the controller 30 causes the plurality of inkjet heads 102y to 102k and the inkjet head 102w to form the plurality of four-color regions 302 and the plurality of white layers 304, so that the four-color regions 302 are superimposed with at least the white layer 304 interposed therebetween.

With this configuration, the layered ink region 300 having the four-color region 302 and the white layer 304 can be appropriately formed.

(7) In the main scanning performed to form the four-color region 302, the controller 30 causes at least two of the plurality of inkjet heads 102y to 102k to eject ink to make the total amount of ink ejected in one main scan larger than a case where main scanning is performed using only one inkjet head.

With this configuration, for example, the time required to form the layered ink region 300 can be appropriately shortened.

(8) At the time of forming the layered ink region 300, the controller 30 sets a forming range of at least some of a plurality of ink layers forming the layered ink region 300 to be smaller than a forming range of lower ink layers.

When forming a plurality of ink layers on top of one another, the outer edge of the ink layer tends to form a raised shape as compared with other parts. However, with this configuration, it is possible to appropriately reduce the influence of the raised outer edge of the ink layer. Additionally, since the outer edge positions of the ink layers are shifted and the raised parts do not overlap, the texture of the side surface part can be improved, for example.

The layered ink region 300 may be formed so as to have a stepped edge, for example. The stepped edge means that, for example, the outer edge positions of ink layers forming the layered ink region 300 are gradually varied to be located inward from the lower layer toward the upper layer. In this case, for example, it is conceivable to vary the outer edge position every time a predetermined number of ink layers are formed.

Additionally, a printing method according to the first embodiment is as follows.

(9) A printing method is for printing on a medium 50 according to an inkjet method.

The printing method uses a plurality of inkjet heads 102y to 102k (color ink heads) that eject different color inks, and
an inkjet head 102w (light reflective ink head) that ejects white ink (light reflective ink).

In the printing method, operation of the plurality of inkjet heads 102y to 102k and the inkjet head 102w are controlled to cause the plurality of inkjet heads 102y to 102k and the inkjet head 102w to form, on the medium 50,
a layered ink region 300 formed by superimposing a plurality of ink layers, and
a color layer 306 (image region) that is a region on which an image is drawn by the plurality of inkjet heads 102y to 102k on the layered ink region 300.

In the printing method, a region is formed as the layered ink region 300, the region including
a plurality of four-color regions 302 (colored regions) that are colored regions formed by causing at least two inkjet heads among the plurality of inkjet heads 102y to 102k to eject ink, and
a plurality of white layers 304 (light reflecting regions) that are regions formed on the four-color region 302 using white ink.

The printing method can appropriately shorten the time required to form the layered ink region 300 by using the plurality of inkjet heads 102y to 102k when forming the four-color region 302 forming a part of the layered ink region 300.

(10) In the printing method, the plurality of inkjet heads 102y to 102k and the inkjet head 102w are used to form the plurality of four-color regions 302 and the plurality of white layers 304, so that the plurality of four-color regions 302 are superimposed with at least the white layer 304 interposed therebetween.

As a result, the white layer 304 can cover the four-color region 302 more appropriately, and it is possible to appropriately prevent the influence of the color of the four-color region 302 when an image is viewed in the color layer 306 which is an image region.

Second Embodiment

Hereinafter, a second embodiment of the present invention will be described. A printing device 10 of the second embodiment has the same configuration as the printing device 10 of the first embodiment shown in FIG. 1. For this reason, the following description will be given by referring to the printing device 10 of FIG. 1 as appropriate.

Figure 7:
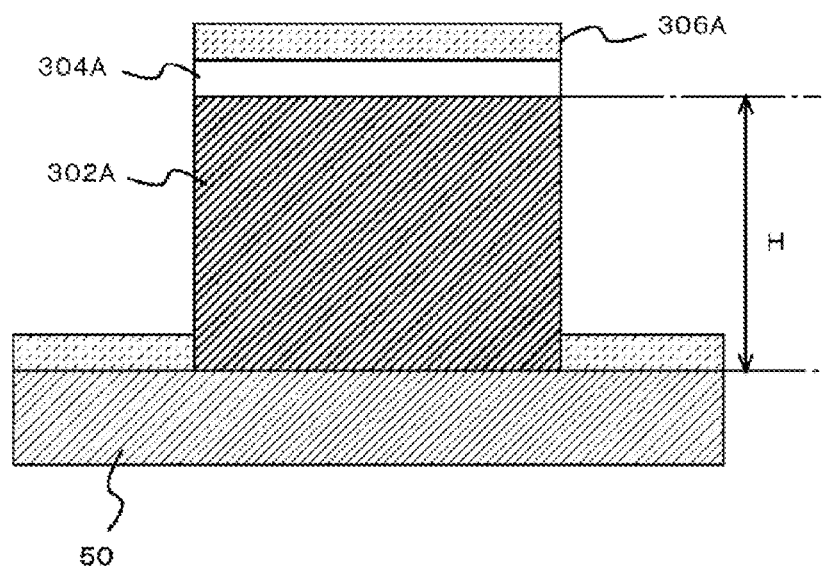
FIG. 7 is a diagram for describing printed matter of a printing device 10 according to a second embodiment of the present invention.

FIG. 7 is a diagram for describing printed matter produced by the printing device 10 according to the second embodiment of the present invention. As described above, in this example, the printing device 10 ejects ink onto a medium 50 to form a plurality of ink layers on top of one another and form a raised shape on the medium 50. Then, in this case, the printing device 10 controls operations of inkjet heads 102y to 102k and an inkjet head 102w (see FIG. 1) by a controller 30, so that a raised region 302A, a white layer 304A, and a color layer 306A are formed on the medium 50.

The raised region 302A is a region where a plurality of ink layers overlap on the medium 50, and corresponds to a colored region described as the four-color region 302 in the first embodiment. In this case, the raised region 302A can be considered as, for example, a region for forming a shape (Z shape) in the layering direction. Additionally, the raised region 302A can be considered as, for example, a region in which a plurality of ink layers are superimposed in order to form a raised shape on the medium 50. Additionally, the raised region 302A can be considered as, for example, a region in which ink layers are superimposed up to a designated height H. Additionally, in this example, the controller 30 of the printing device 10 causes each of the inkjet heads 102y to 102k to eject ink and form the raised region 302A using yellow, magenta, cyan, and black ink. With this configuration, by forming the raised region 302A using four inkjet heads of four colors, the raised region 302A can be formed in a shorter time than in a case of forming the raised region 302A by ejecting ink of only one color with one inkjet head, for example.

Additionally, at the time of forming the raised region 302A, the controller 30 causes the inkjet heads 102y to 102k to eject ink at the same print density, for example. In this case, print density can be considered as, for example, the density of ink ejected onto a unit area in a unit time. More specifically, in this example, the controller 30 causes each of the inkjet heads 102y to 102k to eject ink at a print density of 100%. In this case, a print density of 100% can be considered as, for example, the print density when the ink is ejected once to each ejection position set according to the print resolution. Additionally, causing each of the inkjet heads 102y to 102k to eject ink at a print density of 100% when forming the raised region 302A, for example, can be considered as causing each of the inkjet heads 102y to 102k to eject ink to the range in which the raised region 302A should be formed at a print density of 100%. With this configuration, for example, the raised region 302A can be formed more appropriately in a short time.

The white layer 304A is a region formed by white ink on the raised region 302A. Additionally, in this example, the white layer 304A is an example of a light reflecting region. At the time of forming the white layer 304A, the controller 30 causes the inkjet head 102w to eject white ink to form the white layer 304A so as to cover an upper surface of the raised region 302A. With this configuration, for example, by covering the upper surface of the raised region 302A with the white layer 304A, the color of the raised region 302A can be concealed. Additionally, in this case, it can be considered that the white layer 304A functions as a background of the color layer 306A formed on the white layer 304A.

The color layer 306A is a region on the white layer 304A where an image is drawn by the inkjet heads 102y to 102k. Additionally, in this example, the color layer 306A is an example of an image region. At the time of forming the color layer 306A, the controller 30 causes each of the inkjet heads 102y to 102k to eject ink onto an ejection position set according to the image to be printed. With this configuration, for example, a color image can be appropriately drawn on the white layer 304A. Additionally, in this case, by forming the color layer 306A on the raised region 302A and the white layer 304A, it is possible to draw an image raised from the surface of the medium 50. Additionally, as shown in FIG. 7, in this example, the controller 30 causes the inkjet heads 102y to 102k to also form the color layer 306A in parts on the medium 50 where the raised region 302A and the white layer 304A are not formed, if necessary. With this configuration, for example, a partially raised image or the like can be drawn on the medium 50.

As described above, according to this example, for example, a partially or entirely raised image can be appropriately drawn on the medium 50. Additionally, in this case, by forming the raised region 302A using four color inks of yellow, magenta, cyan, and black, the raised region 302A can be appropriately formed in a short time. Additionally, in this case, since the raised region 302A can be formed in a short time, for example, the height of the raised region 302A can be increased.

More specifically, in the operation of forming the raised region 302A, the controller 30 causes the inkjet heads 102y to 102k to repeatedly perform main scan at the same position, thereby forming a large number of ink layers on top of one another. Then, in this case, as in this example, by forming the raised region 302A using four inkjet heads (inkjet heads 102y to 102k), the time required to superimpose the ink layers up to the predetermined height H can be significantly shortened compared with the case of using only one inkjet head. Additionally, as described above, in this example, the inkjet heads 102y to 102k are arranged side by side in the main scanning direction with their positions aligned in the sub scanning direction. Then, in this case, in each main scan, the inkjet heads 102y to 102k can appropriately eject ink to the same position. Additionally, as a result, the time required to form the raised region 302A can be shortened to, for example, about ¼ as compared with the case where only one inkjet head is used. Additionally, in this case, the raised region 302A is formed by using the inkjet heads 102y to 102k required for forming the color layer 306A, instead of using a dedicated inkjet head to form the raised region 302A. This makes it possible to prevent an increase in the number of inkjet heads included in the printing device 10, for example.

Additionally, in this case, focusing on the height (thickness) of the ink layers that can be formed in the same time, it is considered to be about four times as high as the case where only one inkjet head is used. For this reason, according to this example, it can also be considered that the height of the raised region 302A that can be formed within a predetermined printing time is increased, for example. More specifically, for example, it is conceivable to set the maximum height at which the ink layers are superimposed to about 2.0 mm (e.g., about 1.5 mm to 2.5 mm) in the printing device 10 of this example.

Here, for convenience of illustration, FIG. 7 and each of the drawings described below show an example in which a relatively small number of ink layers are formed on the medium 50. However, at the time of actual printing, it is conceivable to superimpose more ink layers according to the desired height. More specifically, in this example, it is conceivable that the thickness of each of the plurality of ink layers superimposed in the raised region 302A is, for example, about 100 μm. Then, in this case, for example, in order to make the height H of the raised region 302A about 2.0 mm, about 20 ink layers are superimposed. Additionally, as described above, in this example, the raised region 302A is formed by using four color inks of yellow, magenta, cyan, and black. In this case, the color of the raised region 302A is considered to be dark black. Additionally, in this case, the raised region 302A can be considered as a four-color region composed of four colors.

Additionally, when focusing on the point of shortening the time required for forming the raised region 302A and considering the characteristics required for that purpose in a more generalized manner, it can be considered that a characteristic of this example is that at least two of the inkjet heads 102y to 102k are used to form the raised region 302A, for example. In this case, in each main scan performed to form the raised region 302A, the controller 30 causes at least two of the inkjet heads 102y to 102k to eject ink to make the total amount of ink ejected in one main scan larger than a case where the main scan is performed using only one inkjet head. With this configuration, for example, the time required to form the raised region 302A can be appropriately shortened. In this case, the total amount of ink is, for example, the total amount of ink ejected in one main scan per unit area. The amount of ink when main scan is performed using only one inkjet head is considered to be, for example, the maximum amount of ink that can be ejected by one inkjet head in one main scan. Additionally, in this case, as in this example, it can be considered that the raised region 302A is preferably formed with a plurality of inkjet heads arranged side by side in the main scanning direction with their positions aligned in the sub scanning direction.

Figure 8:
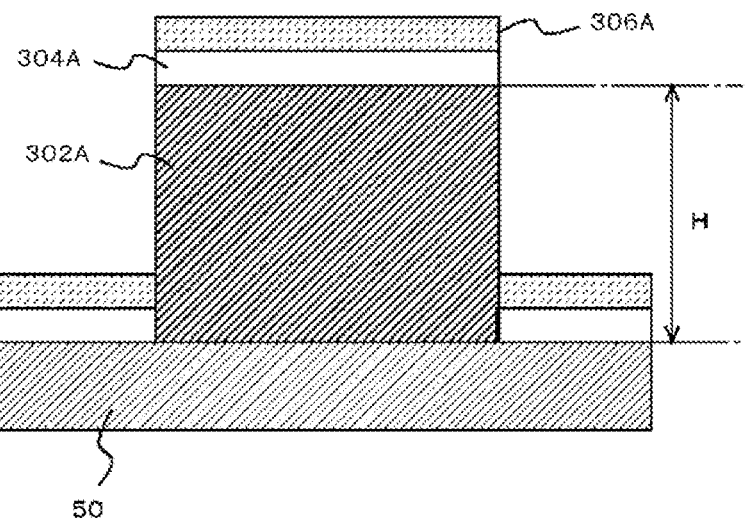
FIG. 8 is a diagram showing a modification of the printed matter. (a) of FIG. 8 shows the configuration of ink layers formed on a medium 50 in this modification. (b) of FIG. 8 shows an example of the range of forming ink layers when forming a raised region 302A, a white layer 304A, and a color layer 306A.
Figure 8:
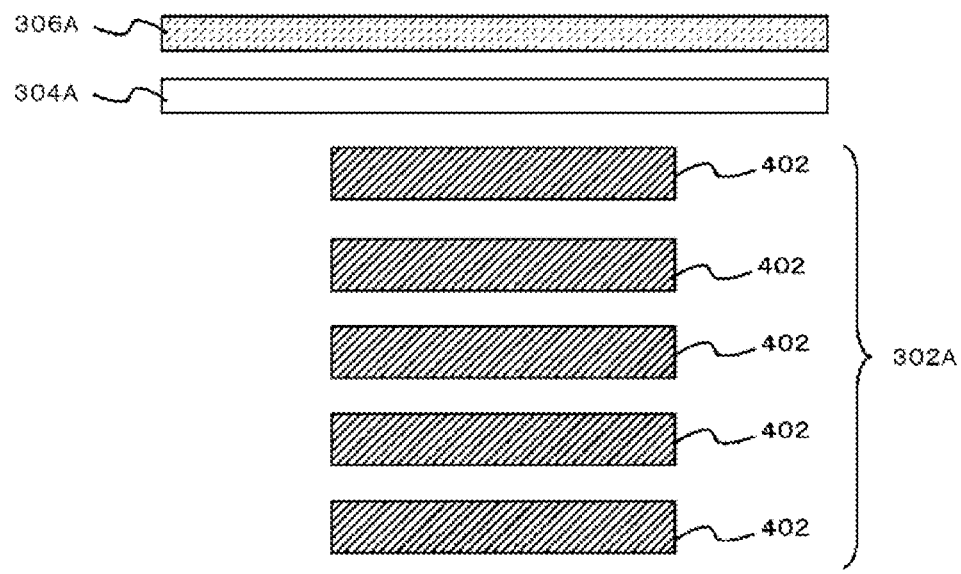

Subsequently, modifications and the like of the printed matter will be described. FIG. 8 shows a modification of the printed matter. (a) of FIG. 8 shows the configuration of ink layers formed on a medium 50 in this modification. Additionally, except for the points described below, configurations in FIG. 8 with the same reference numerals as those in FIG. 7 may have the same or similar characteristics as the configurations in FIG. 7.

As described above, in the configuration shown in FIG. 7, the color of a raised region 302A is concealed by covering an upper surface of the raised region 302A with a white layer 304A. In this regard, in principle, it seems that if the white layer 304A is formed in the same range as the raised region 302A, for example, the color of the raised region 302A can be appropriately concealed.

However, an error may occur in the position where ink dots are fixed due to various causes. In this case, the position where the ink dots are fixed is a position where ink dots formed by landed ink are fixed. Then, in this case, even if the white layer 304A is formed in the same range as the raised region 302A by design, a positional deviation (off-registration) may occur between the two. Then, in this case, if the raised region 302A is not properly covered with the white layer 304A, the color of the raised region 302A becomes conspicuous when an image drawn on the color layer 306A is viewed, and the print quality may deteriorate. In particular, when the black raised region 302A is formed by using four colors of inks of yellow, magenta, cyan, and black, if the color of the raised region 302A is conspicuous, the influence on the print quality becomes large.

Additionally, when the dark black raised region 302A is formed as in this example, the color of a side surface of the raised region 302A may affect the appearance of the image. Additionally, when a plurality of ink layers are formed on top of one another using an inkjet head, for example, the outer edges of the ink layers tend to have a raised shape as compared with other parts. In particular, when a large amount of ink is ejected using a plurality of inkjet heads as in the case of forming the raised region 302A, such a raised shape tends to be formed due to the influence of surface tension according to the characteristics of the ink. Additionally, as a result, the shape of a side surface of the raised region 302A may be tapered. Then, it is considered that off-registration is likely to occur in such a case as well.

On the other hand, in this modification, by forming the white layer 304A in a range wider than the forming range of the raised region 302A, the white layer 304A is formed so as to more reliably cover the upper surface of the raised region 302A. More specifically, FIG. 8 shows an example of the configuration of printed matter in a case of drawing a partially raised image or the like on the medium 50. Then, in this case, the white layer 304A is formed not only on the raised region 302A, but also in a range corresponding to the entire image. In this case, forming the white layer 304A in a range corresponding to the entire image can be considered as, for example, forming the white layer 304A below the color layer 306A in the entire forming range of the color layer 306A. Additionally, in this case, as shown in FIG. 8, the white layer 304A is formed not only on the raised region 302A, but also at positions on the medium 50 where the raised region 302A is not formed.

With such a configuration, by forming the white layer 304A in a range including the forming range of the raised region 302A and wider than the forming range of the raised region 302A, the upper surface of the raised region 302A can be more reliably concealed with the white layer 304A. Additionally, in this case, since white ink is applied to the side surface of the raised region 302A when the white layer 304A is formed, the color of the raised region 302A can be more appropriately concealed. Thus, according to this modification, for example, it is possible to more appropriately prevent the color of the raised region 302A from being viewed around the white layer 304A and the color layer 306A. Additionally, for example, it is possible to appropriately prevent deterioration of print quality due to the influence of the color of the raised region 302A.

Here, as described above, regarding the characteristics of this modification, focusing on the range of forming the raised region 302A and the white layer 304A, for example, it can be considered that the range of forming the white layer 304A is made larger than the region in which the raised region 302A is formed. Regarding such a characteristic, for example, focusing on the operation of the controller 30 (see FIG. 1) of the printing device 10, when the white layer 304A is formed, the controller 30 makes the white region range larger than the raised region range and causes the inkjet head 102w (see FIG. 1) to eject white ink. In this case, the raised region range is a range in which ink is ejected by controlling any of the inkjet heads 102y to 102k (see FIG. 1) in order to form the raised region 302A. Additionally, the white region range is a range in which white ink is ejected by controlling the inkjet head 102w in order to form the white layer 304A. Additionally, in this modification, the white region range is an example of a light reflecting region range. Additionally, making the white region range larger than the raised region range can be considered as, for example, setting the white region range so as to include the raised region range. With this configuration, for example, the white layer 304A covering the raised region 302A can be appropriately formed. As a result, for example, it is possible to appropriately prevent deterioration of print quality due to recognition of the color of the raised region 302A.

Additionally, a configuration in which the white region range is made larger than the raised region range as in this modification can be considered as, for example, a configuration in which the white layer 304A is formed so as to include the raised region 302A. Additionally, in this case, forming the white layer 304A so as to include the raised region 302A can be considered as, for example, forming the white layer 304A by ejecting white ink so that the white ink is also ejected to the outside of the outer edge of the raised region 302A. Additionally, the configuration of forming the white layer 304A so as to include the raised region 302A can be considered as, for example, a configuration in which the color of a raised part in an image changes in the order of black, white, and color from the inside to the outside.

In this case, the range of forming the raised region 302A, the white layer 304A, and the color layer 306A can be shown focusing on the range of forming the ink layers, for example, as shown in (b) of FIG. 8. (b) of FIG. 8 is a diagram showing an example of the range of forming ink layers when each of the raised region 302A, the white layer 304A, and the color layer 306A is formed, and shows an example of the range of forming ink layers when the raised region 302A, the white layer 304A, and the color layer 306A are formed as shown in (a) of FIG. 8. In this case, the range of forming the ink layers can be considered as, for example, the range for ejecting ink by the inkjet heads used for forming the ink layers. Additionally, (b) of FIG. 8 can be considered as, for example, a diagram showing a plurality of ink layers 402 forming the raised region 302A one by one, and showing the white layer 304A and the color layer 306A by connecting parts thereof formed on the raised region 302A and the other parts.

Additionally, when making the white region range larger than the raised region range as in this modification, it is conceivable to set the width of the range of ejecting ink in main scanning performed when forming the raised region 302A and the white layer 304A according to the white region range and the raised region range. In this case, for example, if the width in the main scanning direction of the range in which ink is ejected under control of any inkjet head in one main scan is defined as an ink ejection range width, it is conceivable to vary the width of the white region range and the raised region range in the main scanning direction by varying the ink ejection range width. More specifically, in this case, for example, the controller 30 makes the ink ejection range width in main scan performed when forming the raised region 302A smaller than the ink ejection range width in main scan performed when forming the white layer 304A. With this configuration, for example, the white layer 304A including the raised region 302A can be appropriately formed.

Figure 9:
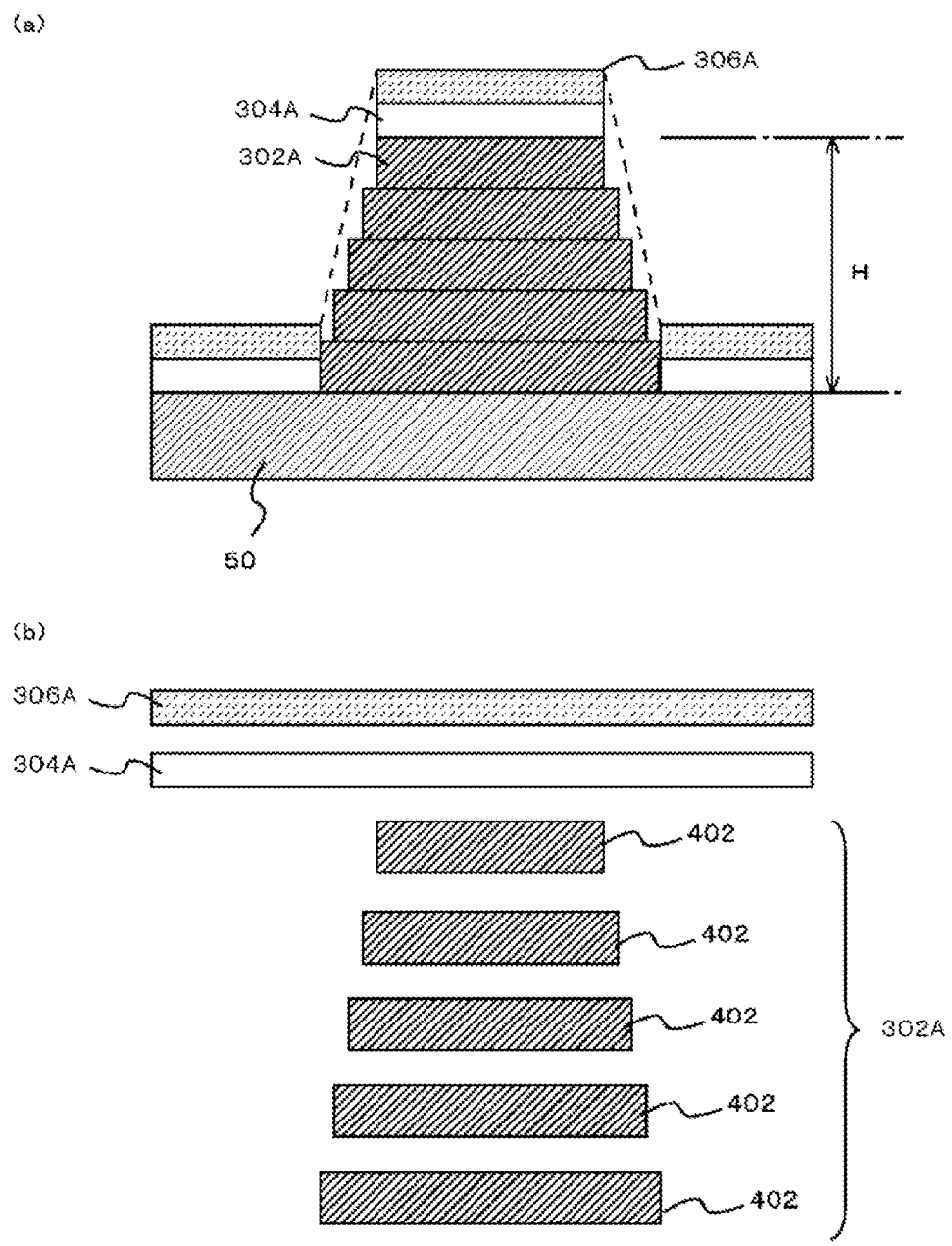
FIG. 9 is a diagram showing another modification of the printed matter. (a) of FIG. 9 shows the configuration of ink layers formed on a medium 50 in this modification. (b) of FIG. 9 shows an example of the range of forming ink layers when forming a raised region 302A, a white layer 304A, and a color layer 306A.

Additionally, depending on the quality required for printing, it is conceivable to make various changes to the shape of the raised region 302A. FIG. 9 shows another modification of the printed matter. (a) of FIG. 9 shows the configuration of ink layers formed on a medium 50 in this modification. (b) of FIG. 9 shows an example of the range of forming ink layers when forming a raised region 302A, a white layer 304A, and a color layer 306A. Additionally, except for the points described below, configurations in FIG. 9 with the same reference numerals as those in FIGS. 7 and 8 may have the same or similar characteristics as the configurations in FIGS. 7 and 8.

In this modification, the raised region 302A is formed by superimposing a plurality of ink layers 402 having different forming ranges, so that the forming range of the upper ink layer 402 is smaller than that of the lower ink layer 402. In this case, it can be considered that the raised region 302A is formed so as to have a stepped edge, for example. The stepped edge of the raised region 302A means that, for example, as shown in FIG. 9, the outer edge positions of ink layers 402 forming the raised region 302A are gradually varied to be located inward from the lower layer toward the upper layer. Additionally, in the case shown in FIG. 9, the outer edge position of the ink layer 402 is varied for each ink layer 402. In this case, at the time of forming the raised region 302A, the controller 30 (see FIG. 1) of the printing device 10 sets the forming range of the plurality of ink layers 402 forming the raised region 302A such that the forming range of an upper ink layer 402 is smaller than the forming range of a lower ink layer 402.

With this configuration, the outer edge positions of the superimposed plurality of ink layers 402 are shifted from one another, so that when the white layer 304A and the color layer 306A are formed, ink ejected from an inkjet head 102w (see FIG. 1) and inkjet heads 102y to 102k (see FIG. 1) can be more appropriately applied to the side surface of the raised region 302A as well, as indicated by a broken line in (a) of FIG. 9. Additionally, for example, on the side surface of the raised region 302A, the color of the raised region 302A can be more appropriately concealed by the white ink used when forming the white layer 304A and the color ink used when forming the color layer 306A. Additionally, in this case, it can be considered that the white layer 304A is made larger than the range of the ink layer 402 formed in the widest range in the raised region 302A, for example. In this modification, too, it can be considered that the white region range is made larger than the raised region range as in the modification shown in FIG. 8.

Additionally, in the present modification, since the outer edge positions of the ink layers 402 forming the raised region 302A are shifted, for example, the texture of a side surface part of the raised region 302A can be improved. More specifically, for example, when a height H of the raised region 302A is high (e.g., when it is about 1.0 mm or more, especially when it is about 2.0 mm or more), depending on the way of superposition of the plurality of ink layers 402 forming the raised region 302A, the state of the side surface may become rough (e.g., jagged state), and the quality of the side surface may deteriorate. On the other hand, when the raised region 302A is formed as in this modification, the side surface of the raised region 302A can be formed more smoothly. Additionally, for example, this makes it possible to more appropriately enhance the texture of the side surface of the raised region 302A.

Even more specifically, as described above, when the raised region 302A is formed by ejecting a large amount of ink using a plurality of inkjet heads, in each ink layer 402 forming the raised region 302A, the outer edge tends to have a raised shape as compared with other parts. Then, in this case, for example, it is considered that superposition of a large number of ink layers 402 formed in the same range is more likely to affect the texture of the side surface of the raised region 302A. On the other hand, in this modification, it is possible to appropriately prevent the outer edges of a large number of ink layers 402 from overlapping at the same position. It is also believed that this can make the side surface of the raised region 302A smoother, for example.

Note that in order to prevent the outer edges of a large number of ink layers 402 from overlapping at the same position, it also seems that, contrary to this modification, the outer edge positions of the ink layers 402 forming the raised region 302A may be gradually varied to be located outward from the lower layer toward the upper layer. In this regard, the inventor of the present application actually conducted an experiment and the like to form the raised region 302A so that the range of the lower ink layer 402 becomes larger as in this modification. As a result, it was confirmed that the texture of the side surface of the can be enhanced more appropriately.

Additionally, when the raised region 302A is formed as in this modification, the distance between the edge positions between the ink layers 402 superimposed consecutively in the layering direction is preferably about several ink dots (e.g., about 1 to 5 dots, preferably about 2 to 4 dots), for example. In this case, ink dots are dots formed by one ejection of ink from one nozzle of the inkjet head onto an ejection position determined according to the printing resolution. The distance between the edge positions between the ink layers 402 superimposed consecutively in the layering direction may preferably be, for example, about 100 μm (e.g., about 50 to 300 μm, preferably about 80 to 150 μm).

Additionally, when the method of forming the raised region 302A as in this modification is considered more generally, for example, it can be considered as a method of varying the outer edge position every time a predetermined number of ink layers 402 are formed. Additionally, in this case, focusing on the operation of the controller 30, at the time of forming the raised region 302A, for example, the controller 30 sets the forming range of at least some of the plurality of ink layers 402 forming the raised region 302A to be smaller than the forming range of the lower ink layer 402. Additionally, in this case, regarding the way of superimposing the ink layers 402 in the raised region 302A, for example, it can be considered that the forming range of the upper ink layer 402 is made smaller than the forming range of the lower ink layer 402.

Figure 10:
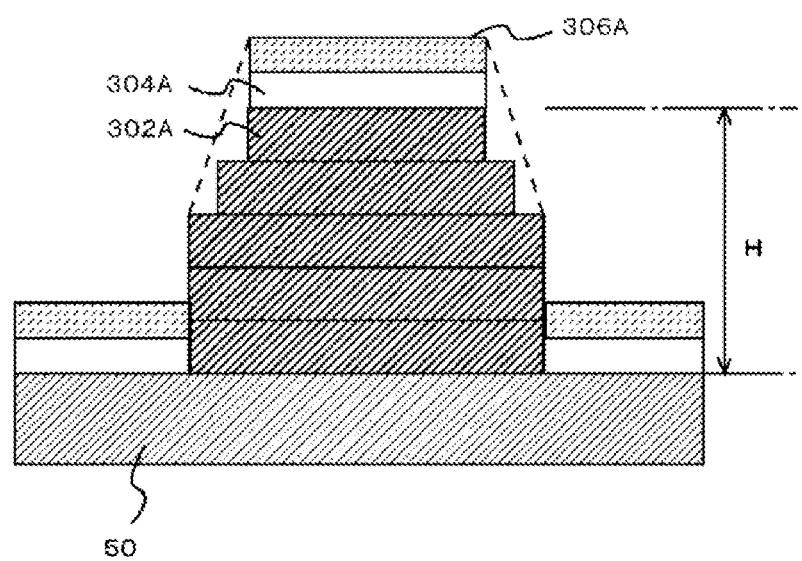
FIG. 10 is a diagram showing another modification of the printed matter. (a) of FIG. 10 shows the configuration of ink layers formed on a medium 50 in this modification. FIG. (b) of 10 shows an example of the range of forming ink layers when forming a raised region 302A, a white layer 304A, and a color layer 306A.
Figure 10:
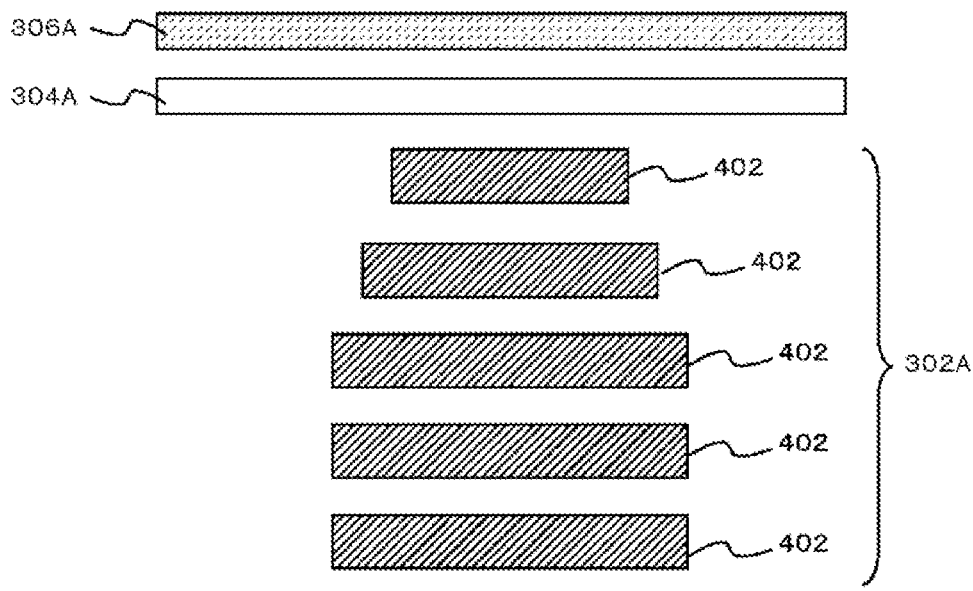

Additionally, it is also possible to vary the forming range of the ink layer 402 forming the raised region 302A only in some of the ink layers 402 near an upper surface of the raised region 302A, for example, as shown in FIG. 10. FIG. 10 shows another modification of the printed matter. (a) of FIG. 10 shows the configuration of ink layers formed on a medium 50 in this modification. (b) of FIG. 10 shows an example of the range of forming ink layers when forming a raised region 302A, a white layer 304A, and a color layer 306A. Additionally, except for the points described below, configurations in FIG. 10 with the same reference numerals as those in FIGS. 7 to 9 may have the same or similar characteristics as the configurations in FIGS. 7 to 9.

In this modification, of a plurality of ink layers 402 forming the raised region 302A, only some the plurality of ink layers 402 near the upper surface of the raised region 302A are formed in a different range than the other ink layers 402. Additionally, in this case, for each of the plurality of ink layers 402 near the upper surface of the raised region 302A, the forming range of the upper ink layer 402 is made smaller than that of the lower ink layer 402, as in the configuration shown in FIG. 9.

With this configuration, too, the outer edge positions of the plurality of ink layers 402 superimposed in a part of the raised region 302A are shifted from one another, so that when the white layer 304A and the color layer 306A are formed, ink ejected from an inkjet head 102w (see FIG. 1) and inkjet heads 102y to 102k (see FIG. 1) can be more appropriately applied to the side surface of the raised region 302A as well, as indicated by a broken line in (a) of FIG. 10. Additionally, for example, this makes it possible to more appropriately conceal the color of the raised region 302A on a side surface of the raised region 302A. Further, in this case, too, since the outer edge positions of the ink layers 402 forming a part of the raised region 302A are shifted, for example, the texture of the side surface part of the raised region 302A can be improved as compared with a case where all the ink layers 402 are formed in the same range.

Further, in the above, mainly, a method of forming the raised region 302A, the white layer 304A, and the color layer 306A when a partially raised image or the like is drawn on the medium 50 has been described. However, in another modification of the printed matter, for example, it is conceivable to perform printing in which the entire image is raised. In this case, printing in which the entire image is raised is printing in which substantially the entire image is drawn on the raised region 302A. Additionally, to draw substantially the entire image on the raised region 302A means that the white layer 304A and the color layer 306A are formed on the raised region 302A, for example, as in the modification described with reference to FIG. 11 below.

Figure 11:
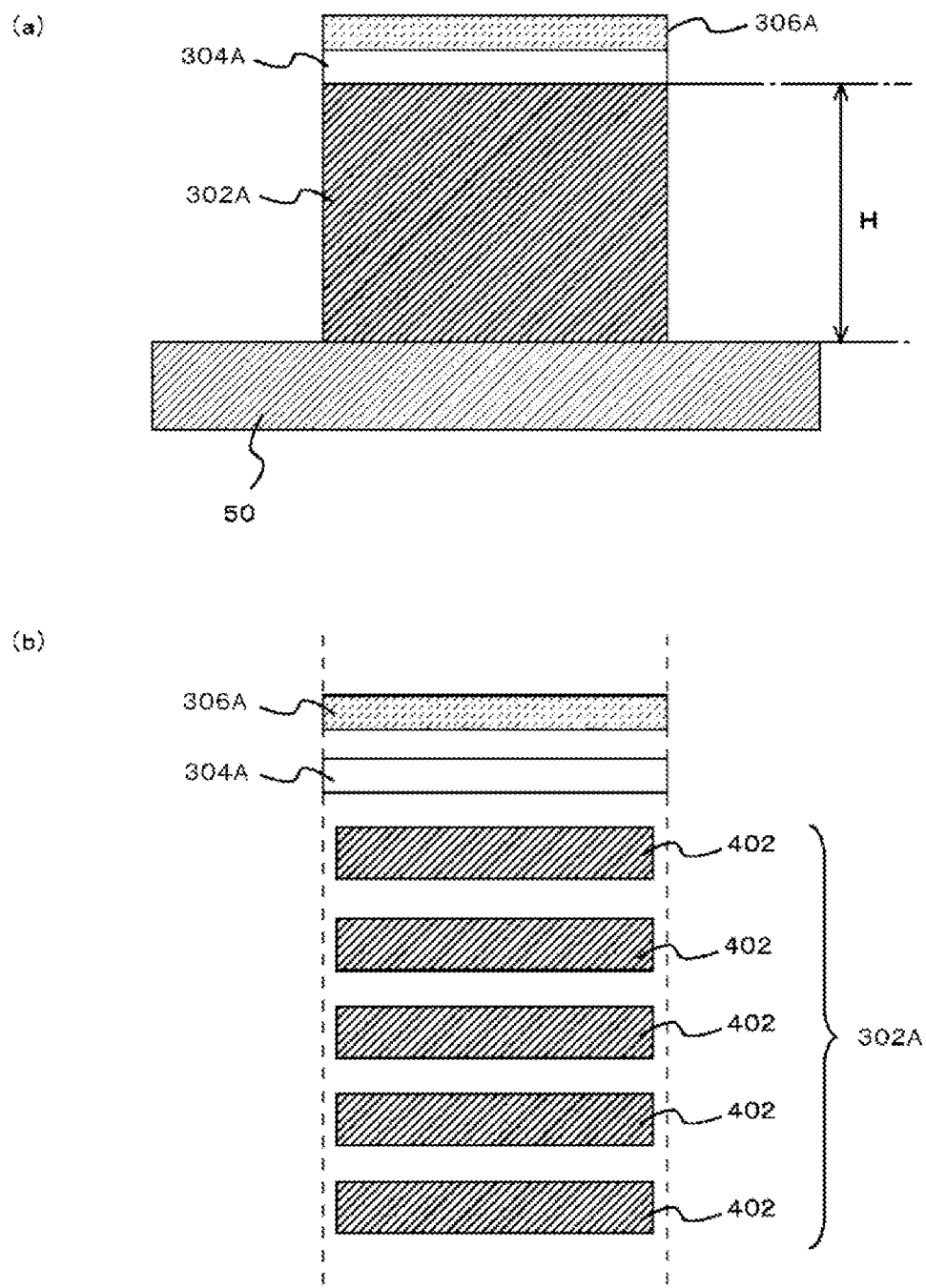
FIG. 11 is a diagram showing another modification of the printed matter. (a) of FIG. 11 shows the configuration of ink layers formed on a medium 50 in this modification. (b) of FIG. 11 shows an example of the range of forming ink layers when forming a raised region 302A, a white layer 304A, and a color layer 306A.

FIG. 11 shows another modification of the printed matter. (a) of FIG. 11 shows the configuration of ink layers formed on a medium 50 in this modification. (b) of FIG. 11 shows an example of the range of forming ink layers when forming a raised region 302A, a white layer 304A, and a color layer 306A. Additionally, except for the points described below, configurations in FIG. 11 with the same reference numerals as those in FIGS. 7 to 9 may have the same or similar characteristics as the configurations in FIGS. 7 to 9.

When printing a raised image as a whole, the image is not drawn directly on the medium 50, but is drawn only on a region where the raised region 302A is formed. Then, in this case, for example, as shown in (a) of FIG. 11, the white layer 304A and the color layer 306A are not formed on the medium 50 in the region where the raised region 302A is not formed, and are formed only on the raised region 302A.

Additionally, in this case, the range of forming the raised region 302A and the white layer 304A is set according to the size of an image represented by the color layer 306A. However, in this case, if the range of forming the raised region 302A and the white layer 304A is simply set according to the size of the image, a positional shift (off-registration) occurs between the raised region 302A and the white layer 304A, which may affect print quality.

On the other hand, in this modification, as shown in (b) of FIG. 11, for example, the range of forming the raised region 302A is made slightly narrower than the range of forming the white layer 304A and the color layer 306A. More specifically, in this case, the position of the edge of the ink layer 402 forming the raised region 302A is preferably located inward by about several dots of ink (e.g., by about 1 to 5 dots, preferably about 2 to 4 dots), for example, of the position of the edge of the white layer 304A. In this case, the position of the edge of the ink layer 402 forming the raised region 302A is, for example, the position of the edge of the ink layer 402 formed in the widest range among the ink layers 402 forming the raised region 302A. Additionally, in this case, the distance between the position of the edge of the ink layer 402 and the position of the edge of the white layer 304A may preferably be, for example, about 100 μm (e.g., about 50 to 300 μm, preferably about 80 to 150 μm).

With this configuration, for example, the white layer 304A can be formed so as to include the raised region 302A even when performing printing in which the entire image is raised. Additionally, this makes it possible to appropriately cover the raised region 302A with the white layer 304A and conceal the color of the raised region 302A. Thus, according to this modification, for example, even when performing printing in which the entire image is raised, it is possible to appropriately prevent the color of the raised region 302A from being conspicuous when an image drawn on the color layer 306A is viewed.

Here, as shown in (b) of FIG. 11, in this modification, the range of forming the white layer 304A and the color layer 306A is made larger than the range of forming the raised region 302A. Then, in this case, it seems that the white layer 304A and the color layer 306A are also formed on the medium 50, as described with reference to FIG. 8, for example. However, as described above, in this modification, the difference between the range of forming the white layer 304A and the color layer 306A and the range of forming the raised region 302A is very small. For this reason, the configuration of this modification can be considered to be a configuration in which the entire image is raised as described above.

Additionally, it is also conceivable to print a plurality of images that are recognized independently of each other on the medium 50. Then, in this case, it is conceivable to form an image raised as a whole only in a certain region of the medium 50, for example. In this case, it can be considered that the raised region 302A, the white layer 304A, and the color layer 306A formed in a certain region of the medium 50 correspond to the raised region 302A, the white layer 304A, and the color layer 306A of this modification. Additionally, in this case, it is conceivable to print a partially raised image in another region of the medium 50.

Additionally, in each of the above configurations including this modification, a controller 30 (see FIG. 1) of a printing device 10 causes inkjet heads 102y to 102k (see FIG. 1) to form the color layer 306A on the basis of print data indicating an image to be printed, for example. Additionally, in this case, as the image data, it is conceivable to use image data in which a raised image range, which is the range in which the inkjet heads 102y to 102k are caused to draw on the raised region 302A, is specified. In this case, it can be considered that, for example, the size of the image to be printed is determined by specifying the raised image range in the print data. Additionally, in each of the above configurations, to cause the inkjet heads 102y to 102k draw an image on the raised region 302A means to draw an image on the raised region 302A and the white layer 304A. Then, in this case, it is conceivable to set the raised region range and the white region range on the basis of the raised image range specified in the image data. The raised region range is a range in which ink is ejected by controlling any of the inkjet heads 102y to 102k in order to form the raised region 302A, as described above. Additionally, the white region range is a range in which white ink is ejected by controlling the inkjet head 102w (see FIG. 1) in order to form the white layer 304A, as described above.

Then, in this modification, by performing processing so that the raised region range becomes narrower than the raised image range specified in the image data, the raised region 302A, the white layer 304A, and the color layer 306A are formed in the range shown in (b) of FIG. 11. Such processing can be considered as, for example, processing of reducing and narrowing the raised region 302A which is a four-color region.

Regarding this point, in order to form the white layer 304A so as to include the raised region 302A in the case of printing in which the entire image is raised, for example, it is conceivable to perform processing of reducing the size of the raised region 302A or processing of enlarging the region other than the raised region 302A. However, in this case, it is conceivable that if the processing of enlarging the region other than the raised region 302A is performed, the influence on the appearance of the image will be large. More specifically, when the processing of enlarging the region other than the raised region 302A is performed, for example, it is conceivable that the white layer 304A and the color layer 306A are made larger than the size specified in the image data. In this case, for example, changing the size of the image drawn on the color layer 306A may increase the influence on the appearance of the image. On the other hand, for example, when the white layer 304A is caused to include the raised region 302A by reducing the size of the raised region 302A, such a problem is unlikely to occur. For this reason, when the white layer 304A is formed so as to include the raised region 302A, it is preferable to perform processing of reducing the size of the raised region 302A as in this modification.

Additionally, when considering the characteristics of this modification by focusing on the operation of the controller 30, the controller 30 sets, for example, the raised area range so that the raised region range is smaller than the raised image range. Then, by setting the white region range according to the raised image range, the white region range is made larger than the raised region range. With this configuration, for example, by narrowing the raised region 302A in advance, the white layer 304A can be appropriately formed so as to include the raised region 302A.

Additionally, the controller 30 receives the image data from the outside of the printing device 10, for example. In this case, the controller 30 may further receive white region data, which is data indicating the white region range, from the outside of the printing device 10. In this case, the white region data is an example of light reflecting region data. Additionally, it is conceivable that the user specifies the white region range indicated by the white region data according to the raised image range, for example. Additionally, in this case, the controller 30 sets the white region range on the basis of the white region data, to thereby set the white region range according to the raised image range, for example. Further, the controller 30 sets the raised region range so that the raised region range is smaller than the white region range, for example, on the basis of the white region data. With this configuration, for example, the white region range and the raised region range can be appropriately set.

Additionally, FIG. 11 shows an example in which the ranges of all the ink layers 402 (forming range of ink layers 402) forming the raised region 302A are the same in the case of performing printing in which the entire image is raised. However, in another modification of the printed matter in the case of performing printing in which the entire image is raised, the range of at least some of the ink layers 402 forming the raised region 302A may be varied from the range of the other ink layers 402. Additionally, in this case, regarding the raised region 302A, as described above with reference to FIGS. 9 and 10, for example, it is conceivable to make the forming range of the upper ink layer 402 smaller than that of the lower ink layer 402. Additionally, in this case, the raised region range can be considered as, for example, the range of the ink layer 402 formed in the widest range. Even in this configuration, for example, by narrowing the raised region 302A in advance, the white layer 304A can be appropriately formed so as to include the raised region 302A.

Subsequently, supplementary explanations and the like regarding each configuration described above will be given. In FIGS. 7 to 11, for convenience of illustration, the raised region 302A has a shape with a flat upper surface. However, as shown in FIG. 12, for example, it is conceivable to form the raised region 302A in a shape having different heights depending on the position.

Figure 12:
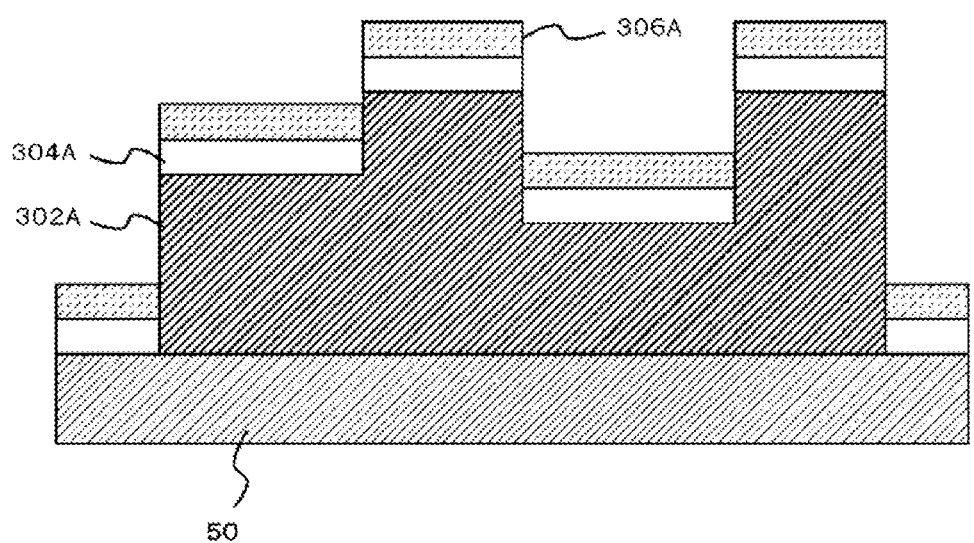
FIG. 12 is a diagram for describing the shape of the raised region 302A in more detail.

FIG. 12 is a diagram for describing the shape of the raised region 302A in more detail. In this case, the raised region 302A can be considered as, for example, a region having different heights depending on the position of the medium 50. Additionally, the raised region 302A can be considered as, for example, a region that is raised in an irregular shape. Even when such a raised region 302A is formed, by forming the white layer 304A in a wider range than the raised region 302A, the white layer 304A can be appropriately formed so as to include the raised region 302A. As a result, for example, it is possible to appropriately prevent the color of the raised region 302A from being conspicuous and the print quality from being deteriorated when the image drawn on the color layer 306A is viewed.

Additionally, FIG. 12 shows an example of the configuration of the raised region 302A, the white layer 304A, and the color layer 306A in the case of drawing a partially raised image or the like on the medium 50. In the case of performing printing in which the entire image is raised, as described above with reference to FIG. 11, by regarding the range of the ink layer 402 formed in the widest range among the ink layers 402 forming the raised region 302A as a raised region range, it is conceivable to set the raised region range and the white region range so that the raised region range is smaller than the white region range. Even in such a configuration, for example, it is possible to appropriately prevent the color of the raised region 302A from being conspicuous and the print quality from being deteriorated when an image drawn on the color layer 306A is viewed.

As described above, the printing device 10 according to the second embodiment includes the following configurations.

(11) A controller 30 causes at least two of a plurality of inkjet heads 102y to 102k (color ink heads) to eject ink to form, as a colored region, a raised region 302A that is a region where a plurality of ink layers overlap on a medium 50.

Similar to the first embodiment, in the second embodiment, at least two inkjet heads are used to form the raised region 302A. As a result, the time required for forming the raised region 302A can be appropriately shortened, and the time required for the printing operation can be reduced. Additionally, by forming the raised region 302A with the inkjet heads 102y to 102k, it is possible to prevent an increase in the number of inkjet heads included in the printing device 10.

(12) A printing device 10 further includes a main scan driving unit 16. The main scan driving unit 16 causes the plurality of inkjet heads 102y to 102k and the inkjet head 102w (light reflective ink head) to perform main scan of ejecting ink while moving relative to the medium 50 in a preset main scanning direction.

In the main scan performed to form the raised region 302A, the controller 30 causes at least two of the plurality of inkjet heads 102y to 102k to eject ink to make the total amount of ink ejected in one main scan larger than a case where main scan is performed using only one inkjet head.

With this configuration, for example, the time required to form the raised region 302A can be appropriately shortened.

(13) The printing device 10 includes, as a plurality of inkjet heads 102y to 102k,
an inkjet head 102y that ejects yellow ink,
an inkjet head 102m that ejects magenta ink,
an inkjet head 102c that ejects cyan ink, and
an inkjet head 102k that ejects black ink.

At the time of forming the raised region 302A, the controller 30 causes at least the four inkjet heads 102y to 102k that eject yellow, magenta, cyan, and black ink to eject ink.

With this configuration, for example, the time required to form the raised region 302A can be more appropriately shortened.

(14) The printing device 10 further includes a main scan driving unit 16. The main scan driving unit 16 causes the plurality of inkjet heads 102y to 102k and the inkjet head 102w to perform main scanning of ejecting ink while moving relative to the medium 50 in a preset main scanning direction.

At least two inkjet heads used for forming the raised region 302A are arranged side by side in the main scanning direction with their positions aligned in the sub scanning direction orthogonal to the main scanning direction.

With this configuration, for example, the raised region 302A can be appropriately formed by using the plurality of inkjet heads 102y to 102k.

(15) When a range for ejecting ink by controlling any of the inkjet heads 102y to 102k to form the raised region 302A is defined as a raised region range, and a range for ejecting white ink (light reflective ink) by controlling the inkjet head 102w to form the white layer 304A (light reflecting region) is defined as a white region range (light reflecting region range), at the time of forming the white layer 304A, the controller 30 makes the white region range larger than the raised region range and causes the inkjet head 102w to eject white ink.

With this configuration, for example, the white layer 304A covering the raised region 302A can be more appropriately formed. Additionally, it is possible to appropriately prevent deterioration of print quality due to recognition of the color of the raised region 302A.

(16) The controller 30 causes the plurality of inkjet heads 102y to 102k to form the color layer 306 (image region) on the basis of image data. The image data is data indicating an image to be printed, and is data in which a raised image range, which is a range for drawing an image on the raised region 302A by controlling the plurality of inkjet heads 102y to 102k.

The controller 30 sets the raised region range so that the raised region range is smaller than the raised image range, and sets the white region range according to the raised image range to make the white region range larger than the raised region range.

In order to form the white layer 304A so as to include the raised region 302A, for example, it is conceivable to perform processing of reducing the size of the raised region 302A or processing of enlarging the region other than the raised region 302A. However, in this case, it is conceivable that if the processing of enlarging the region other than the raised region 302A is performed, the influence on the appearance of the image will be large. More specifically, when performing the processing of enlarging the region other than the raised region 302A, for example, it is conceivable to enlarge the white layer 304A and the color layer 306A which is an image region. However, it is conceivable that the size of the image drawn in the color layer 306A will change and the influence on the appearance of the image will increase.

In the second embodiment, the raised region range is set so that the raised region range is smaller than the raised image range, and the white region range is set according to the raised image range to reduce the size of the raised region 302A so that it can be included in the white layer 304A. As a result, it is possible to curb a change in the size of the image drawn in the color layer 306A, which is an image region, and reduce the influence on the appearance of the image.

(17) At the time of forming the raised region 302A, the controller 30 sets a forming range of at least some of a plurality of ink layers forming the raised region 302A to be smaller than a forming range of lower ink layers.

By performing settings in this way, the color of the raised region 302A can be more appropriately concealed by the white layer 304A. Additionally, in this case, by shifting the outer edge positions of the ink layers, it is possible to improve the texture of a side surface part, for example. Note that the white region range may be made larger than the range of the ink layer formed in the widest range in the raised region 302A, for example. As a result, the white layer 304A can more appropriately conceal the color of the raised region 302A.

Additionally, regarding the way of superimposing the plurality of ink layers in the raised region 302A, in the case of making the forming range of the upper ink layers smaller than the forming range of the lower ink layers, the raised region 302A may have a stepped edge, for example. When the raised region 302A has a stepped edge, for example, the outer edge positions of the ink layers forming the raised region 302A are gradually varied to be located inward from the lower layer toward the upper layer. In this case, for example, it is conceivable to vary the outer edge position every time a predetermined number of ink layers are formed. Additionally, in this case, the controller 30 may cause at least two of the plurality of inkjet heads 102y to 102k to form the raised region 302A having a stepped edge, for example. With this configuration, the texture of a side surface part of the raised region 302A can be improved more appropriately.

(18) At the time of forming the raised region 302A, the controller 30 sets the forming range of the plurality of ink layers forming the raised region 302A such that the forming range of an upper ink layer is smaller than the forming range of a lower ink layer.

By performing settings in this way, the range of the plurality of ink layers forming the raised region 302A can be gradually reduced each time one layer is formed. As a result, the texture of the side surface part of the printed matter can be improved more appropriately.

A printing method according to the second embodiment is as follows.

(19) At least two of a plurality of inkjet heads 102y to 102k are controlled to eject ink to form, as a colored region, a raised region 302A that is a region where a plurality of ink layers overlap on a medium 50.

Similar to the first embodiment, in the second embodiment, the time required to form the raised region 302A can be appropriately shortened by forming the raised region 302A using at least two inkjet heads.

INDUSTRIAL APPLICABILITY

The present invention can be suitably used for a printing device, for example.

The invention claimed is:

1. A printing device that prints on a medium according to an inkjet method, the printing device comprising:
a plurality of color ink heads that are a plurality of inkjet heads that eject different color inks;
a light reflective ink head that is an inkjet head that ejects light reflective ink; and
a controller that controls operation of the plurality of color ink heads and the light reflective ink head, wherein
the controller causes the plurality of color ink heads and the light reflective ink head to form, on the medium,
a layered ink region formed by superimposing a plurality of ink layers, and
an image region that is a region where an image is drawn by the plurality of color ink heads on the layered ink region, and
the layered ink region is a region including a plurality of colored regions that are colored regions formed by ejecting ink under control of at least two inkjet heads among the plurality of color ink heads, and
a plurality of light reflecting regions that are regions formed on the colored region using the light reflective ink;
wherein the printing device further comprises:
a main scan driving unit that causes the plurality of color ink heads and the light reflective ink head to perform a main scan of ejecting ink while moving relative to the medium in a preset main scanning direction, wherein
the at least two inkjet heads used for forming the colored region are arranged side by side in the main scanning direction with their positions aligned in the sub scanning direction orthogonal to the main scanning direction; and
a sub scan driving unit that causes the plurality of color ink heads and the light reflective ink head to perform a sub scan of moving relative to the medium in the sub scanning direction, wherein
the light reflective ink head is arranged so as to be shifted from the at least two inkjet heads used for forming the colored region in the sub scanning direction, and
the controller controls the main scan driving unit and the sub scan driving unit so that the main scan is repeatedly performed with the sub scan interposed therebetween, to cause the plurality of color ink heads and the light reflective ink head to form a plurality of the colored regions and a plurality of the light reflecting regions so that the colored regions are superimposed with at least the light reflecting region interposed therebetween.

2. The printing device as set forth in claim 1, wherein the controller causes the plurality of color ink heads and the light reflective ink head to form a plurality of the colored regions and a plurality of the light reflecting regions so that the colored regions are superimposed with at least the light reflecting region interposed therebetween.

3. The printing device as set forth in claim 1, wherein the controller causes the plurality of color ink heads to form a region to be colored that is a region to be colored with a color matching an image drawn in the image region, on at least some of the light reflecting regions in the layered ink region.

4. The printing device as set forth in claim 1 further comprising, as the plurality of color ink heads,
an inkjet head that ejects yellow ink,
an inkjet head that ejects magenta ink,
an inkjet head that ejects cyan ink, and
an inkjet head that ejects black ink, wherein
at the time of forming the colored region, the controller causes at least the four inkjet heads that eject yellow, magenta, cyan, and black ink to eject ink.

5. The printing device as set forth in claim 1, wherein in the main scan performed to form the colored region, the controller causes at least two inkjet heads among the plurality of color ink heads to eject ink to make the total amount of ink ejected in one main scan larger than a case where the main scan is performed using only one inkjet head.

6. The printing device as set forth in claim 1, wherein at the time of forming the layered ink region, the controller sets a forming range of at least some of a plurality of ink layers forming the layered ink region to be smaller than a forming range of a lower ink layer.

7. The printing device as set forth in claim 1, wherein the controller causes at least two inkjet heads among the plurality of color ink heads to eject ink to form, as the colored region, a raised region that is a region where a plurality of ink layers overlap on the medium.

8. The printing device as set forth in claim 7 further comprising a main scan driving unit that causes the plurality of color ink heads and the light reflective ink head to perform a main scan of ejecting ink while moving relative to the medium in a preset main scanning direction, wherein
in the main scan performed to form the raised region, the controller causes at least two inkjet heads among the plurality of color ink heads to eject ink to make the total amount of ink ejected in one main scan larger than a case where the main scan is performed using only one inkjet head.

9. The printing device as set forth in claim 7 further comprising, as the plurality of color ink heads,
an inkjet head that ejects yellow ink,
an inkjet head that ejects magenta ink,
an inkjet head that ejects cyan ink, and
an inkjet head that ejects black ink, wherein
at the time of forming the raised region, the controller causes at least the four inkjet heads that eject yellow, magenta, cyan, and black ink to eject ink.

10. The printing device as set forth in claim 7, wherein
the at least two inkjet heads used for forming the raised region are arranged side by side in the main scanning direction with their positions aligned in the sub scanning direction orthogonal to the main scanning direction.

11. The printing device as set forth in claim 7, wherein
when a range for ejecting ink by controlling any of the inkjet heads to form the raised region is defined as a raised region range, and a range for ejecting the light reflective ink by controlling the light reflective ink head to form the light reflecting region is defined as a light reflecting region range, at the time of forming the light reflecting region, the controller makes the light reflecting region range larger than the raised region range and causes the light reflective ink head to eject light reflective ink.

12. The printing device as set forth in claim 11, wherein
the controller causes the plurality of color ink heads to form the image region on the basis of image data that is data indicating an image to be printed and in which a raised image range that is a range in which an image is drawn on the raised region by the plurality of color ink heads is designated, and
sets the raised region range so that the raised region range is smaller than the raised image range and sets the light reflecting region range according to the raised image range, to make the light reflecting region range larger than the raised region range.

13. The printing device as set forth in claim 7, wherein
at the time of forming the raised region, the controller sets a forming range of at least some of a plurality of ink layers forming the raised region to be smaller than a forming range of a lower ink layer.

14. The printing device as set forth in claim 7, wherein
at the time of forming the raised region, the controller sets a forming range of each of a plurality of ink layers forming the raised region such that a forming range of an upper ink layer is smaller than a forming range of a lower ink layer.

15. A printing method of printing on a medium according to an inkjet method by a printing device of claim 1, the printing method comprising,
using the plurality of color ink heads that are the plurality of inkjet heads that eject different color inks, and
the light reflective ink head that is the inkjet head that ejects light reflective ink,
controlling operation of the plurality of color ink heads and the light reflective ink head to cause the plurality of color ink heads and the light reflective ink head to form, on the medium,
the layered ink region formed by superimposing the plurality of ink layers, and
the image region that is the region where the image is drawn by the plurality of color ink heads on the layered ink region, and
forming, as the layered ink region, the region including
the plurality of colored regions that are colored regions formed by ejecting ink under control of at least two inkjet heads among the plurality of color ink heads, and
the plurality of light reflecting regions that are regions formed on the colored region using the light reflective ink.

16. The printing method as set forth in claim 15, wherein
the plurality of color ink heads and the light reflective ink head are caused to form the plurality of colored regions and the plurality of light reflecting regions, so that the colored regions are superimposed with at least with the light reflecting region interposed therebetween.

17. The printing method as set forth in claim 15, wherein
at least two inkjet heads among the plurality of color ink heads are caused to eject ink to form, as the colored region, a raised region that is a region where a plurality of ink layers overlap on the medium.

* * * * *